(12) United States Patent
Jung et al.

(10) Patent No.: US 11,508,267 B2
(45) Date of Patent: Nov. 22, 2022

(54) STRETCHABLE DISPLAY DEVICE

(71) Applicant: LG Display Co., Ltd., Seoul (KR)

(72) Inventors: Jin-Hyun Jung, Paju-si (KR);
Seok-Won Ji, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 152 days.

(21) Appl. No.: 17/102,022

(22) Filed: Nov. 23, 2020

(65) Prior Publication Data

US 2021/0166590 A1    Jun. 3, 2021

(30) Foreign Application Priority Data

Dec. 2, 2019    (KR) .......... 10-2019-0158114

(51) Int. Cl.
  *G06F 1/18*    (2006.01)
  *G09F 9/30*    (2006.01)
(52) U.S. Cl.
  CPC .............. *G09F 9/301* (2013.01); *G06F 1/189* (2013.01)
(58) Field of Classification Search
  CPC .................................................... G06F 1/1652
  See application file for complete search history.

(56) References Cited

U.S. PATENT DOCUMENTS

| 10,331,173 | B2* | 6/2019 | Cho ................... G09F 9/301 |
| 2012/0314382 | A1 | 12/2012 | Wesselmann et al. |
| 2018/0175131 | A1 | 6/2018 | Lee |
| 2019/0275347 | A1* | 9/2019 | Ouyang ............... A61N 5/0613 |
| 2019/0302917 | A1* | 10/2019 | Pan ..................... H01L 27/1266 |
| 2021/0364845 | A1 | 11/2021 | Wang et al. |

FOREIGN PATENT DOCUMENTS

| KR | 10-0730196 B1 | 6/2007 |
| KR | 10-2009-0129144 A | 12/2009 |

* cited by examiner

*Primary Examiner* — Jerry Wu
(74) *Attorney, Agent, or Firm* — Seed IP Law Group LLP

(57) ABSTRACT

A stretchable display device is provided. The display device includes a stretchable display panel, a flexible printed circuit board connected to the stretchable display panel, and a connecting circuit connecting the stretchable display panel and the flexible printed circuit board. The flexible printed circuit board includes a non-deformation region and a deformation region outside the non-deformation region. The flexible printed circuit board further includes a stretchable base substrate, a circuit component on the base substrate, and a compensating layer on the base substrate. The compensating layer is locally disposed in the non-deformation region and the circuit component is locally disposed in the non-deformation region.

18 Claims, 16 Drawing Sheets

STRETCHABLE DISPLAY DEVICE

CROSS REFERENCE TO RELATED APPLICATIONS

The present application claims the priority benefit of Korean Patent Application No. 10-2019-0158114 filed in Republic of Korea on Dec. 2, 2019, which is hereby incorporated by reference in its entirety for all purposes as if fully set forth herein.

BACKGROUND

Technical Field

The present disclosure relates to a stretchable display device, and more particularly, to a stretchable display where a stress due to a stretching is reduced.

Description of the Related Art

A display device used for a monitor of a computer, a television and a portable phone includes an organic light emitting diode (OLED) display device of an emissive type and a liquid crystal display (LCD) device of a non-emissive type having an additional light source.

A display device has been applied to a personal portable device as well as a monitor of a computer and a television. A display device having a wide display area and reduced volume and weight has been researched.

Recently, as a technology relating to a display device is improved, a flexible display device capable of being bent or rolled has been researched and developed. In addition, a stretchable display device capable of being stretched along a horizontal direction or a vertical direction has been widely researched and developed.

The stretchable display device includes a display panel where an element for displaying an image is disposed on a resin substrate having an elasticity, a printed circuit board of a panel driver driving the display panel and a connector electrically connecting the display panel and the printed circuit board.

BRIEF SUMMARY

The inventors of the present disclosure have realized that while the display panel of the stretchable display device includes a material having an elasticity, the standard printed circuit board electrically connected to the display panel does not include usually a material that is sufficiently elastic for the stretching a stretchable display may undergo. Because the printed circuit board may limit the elasticity of the stretchable display device, the inventors of the present disclosure provided a display device that also includes a printed circuit board having elasticity.

The present disclosure is directed to a stretchable display device that substantially obviates one or more of the problems due to limitations and disadvantages of the related art.

As explained, one or more embodiments of the present disclosure provides a stretchable display device including a flexible printed circuit board capable of being stretched to correspond to an elasticity thereof.

Additional features and technical benefits of the disclosure will be set forth in the description which follows, and in part will be apparent from the description, or may be learned by practice of the disclosure. These and other benefits of the disclosure will be realized and attained by the structure particularly pointed out in the written description and claims hereof as well as the appended drawings.

To achieve these and other benefits and in accordance with the purpose of the present disclosure, as embodied and broadly described herein, a stretchable display device includes: a stretchable display panel; a flexible printed circuit board connected to the stretchable display panel, the flexible printed circuit board including a non-deformation region and a deformation region outside the non-deformation region; and a connecting circuit connecting the stretchable display panel and the flexible printed circuit board, wherein the flexible printed circuit board includes: a stretchable base substrate; a circuit component over the base substrate, the circuit component locally disposed in the non-deformation region; and a compensating layer over the base substrate and locally disposed in the non-deformation region.

In another aspect, a stretchable display device includes: a stretchable display panel; a flexible printed circuit board connected to the stretchable display panel, the flexible printed circuit board including a non-deformation region and a deformation region outside the non-deformation region; and a connecting circuit connecting the stretchable display panel and the flexible printed circuit board, wherein the flexible printed circuit board includes: a stretchable base substrate having a plurality of through holes dispersively disposed; a filling layer in the plurality of through holes; and a circuit component over the base substrate and locally disposed in the non-deformation region.

It is to be understood that both the foregoing general description and the following detailed description are explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1A:
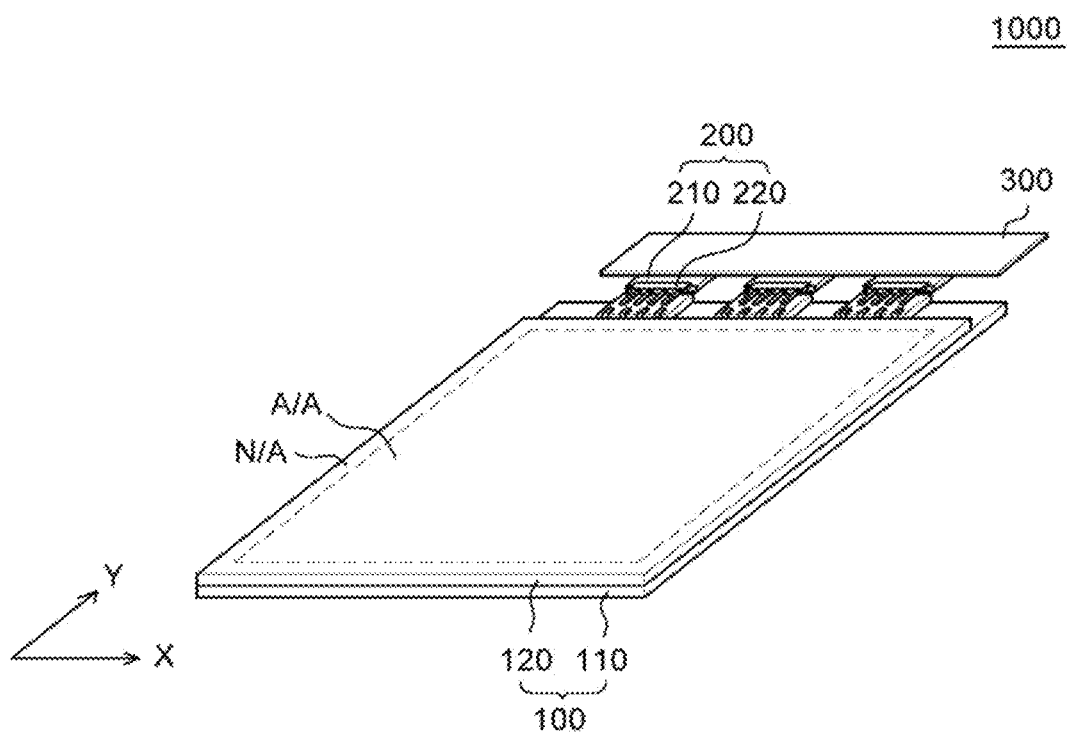
FIGS. 1A and 1B are a perspective view and an exploded perspective view showing a stretchable display device according to a first embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, an organic light emitting display device according to embodiments of the present disclosure will be described in detail with reference to the accompanying drawings. In the following description, like reference numerals designate like elements throughout. When a detailed description of well-known functions or configurations related to this document is determined to unnecessarily cloud a gist of the inventive concept, the detailed description thereof will be omitted or will be made brief.

A stretchable display device according to the present disclosure may include a display device capable of displaying an image even when the display device is bent or stretched. The stretchable display device may have a high flexibility as compared with a conventional display device. A shape of the stretchable display device may be freely changed according to a manipulation of a user such as bending or stretching of the stretchable display device. For example, when a user grasps and pulls an end portion of the stretchable display device, the stretchable display device may be stretched due to a user's force. Alternatively, when a user disposes the stretchable display device on a wall having an uneven surface, the stretchable display device may be disposed bent according to a shape of the uneven surface of the wall. Further, when the user's force is removed, the stretchable display device may return to have an original shape.

Figure 1B:
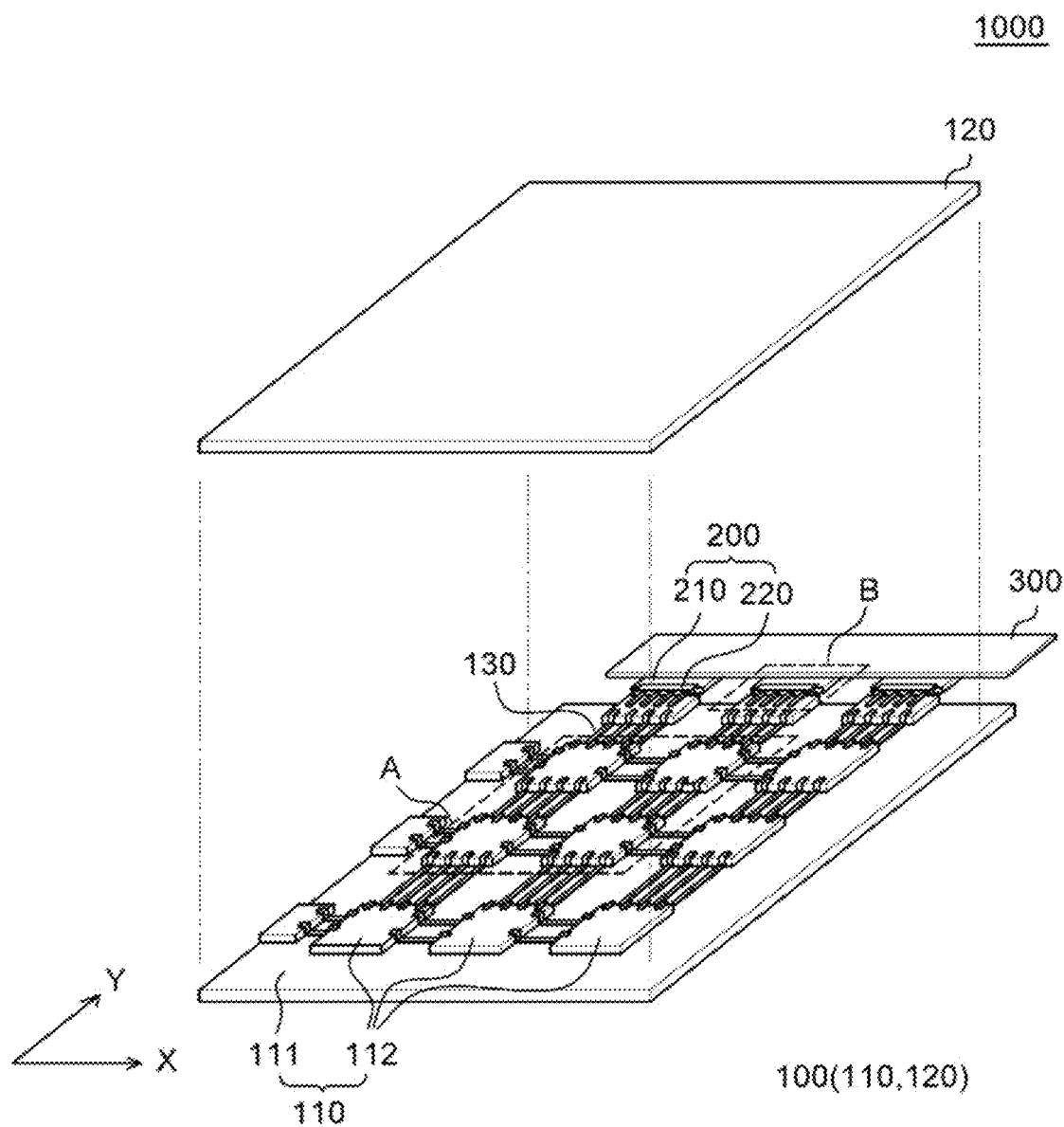

FIGS. 1A and 1B are a perspective view and an exploded perspective view showing a stretchable display device according to a first embodiment of the present disclosure.

In FIGS. 1A and 1B, a stretchable display device 1000 according to a first embodiment of the present disclosure includes a display panel 100, a connecting circuit 200 and a flexible printed circuit board (PCB) 300.

The display panel 100 is capable of being stretched along one of a first direction X and a second direction Y or is capable of being two-dimensionally stretched along one of a first direction X and a second direction Y. The first direction X and the second direction Y may constitute a plane of the stretchable display device 1000, and the second direction Y may be perpendicular to the first direction X.

The display panel 100 includes a first substrate 110 and a second substrate 120. Although not shown in FIGS. 1A and 1B, the display panel 100 may further include a polarizing plate on an outer surface of one of the first substrate 110 and the second substrate 120.

The first substrate 110 protects and supports elements disposed in the display panel 100. The first substrate 110 may include a lower substrate 111 of a ductile material capable of being bent or stretched and an island substrate 112 of a stiff material. The island substrate 112 is not disposed on a whole of the lower substrate 111. Instead, the plurality of island substrates 112 are selectively (locally) disposed in a predetermined region on the lower substrate 111 as an island shape. The adjacent island substrates 112 may be spaced apart from each other. The detailed structure of the first substrate 110 will be illustrated with reference to FIG. 2.

The second substrate 120 overlaps the first substrate 110 and supports the elements in the display panel 100. The second substrate 120 of a flexible may include an insulating material capable of being bent or stretched. For example, the second substrate 120 may include an elastic material and may include the same material as the lower substrate 111 of the first substrate 110. However, the second substrate 120 is not limited thereto.

The display panel 100 includes a display area A/A displaying an image and a non-display area N/A adjacent to the display area A/A and surrounding the display area A/A.

The display area A/A includes a plurality of pixels each including a plurality of sub-pixels. Each of the plurality of sub-pixels includes an emitting element and may be connected to conductive lines such as a gate line, a data line, a high level voltage line, a low level voltage line and a reference voltage line.

The non-display area N/A does not display an image. The conductive lines of the display area A/A may extend to the non-display area N/A and a circuit unit may be disposed in the non-display area N/A. For example, a plurality of bonding pads or a plurality of signal pads may be disposed in the non-display area N/A, and the pads of the non-display area N/A may be connected to the plurality of sub-pixels, respectively, of the display area A/A.

A first region and a second region having different moduli may be defined in each of the display area A/A and the non-display area N/A. Each of the plurality of pixels may be disposed in the first region of the display area A/A and the conductive lines electrically connecting the plurality of pixels may be disposed in the second region of the display area A/A. Each of the plurality of bonding pads electrically connected to the connecting circuit 200, the circuit unit applying a driving signal to each of the plurality of pixels and each of the plurality of signal pads applying the driving signal to each of the plurality of pixels may be disposed in the first region of the non-display area N/A, and the conductive lines extending from the display area A/A may be disposed in the second region of the non-display area N/A. The detailed structure of the display panel 100 will be illustrated with reference to FIGS. 2 and 3.

The connecting circuit 200 transmits a signal inputted from the flexible PCB 300 to the display panel 100. The connecting circuit 200 may include a connection film disposed between the display panel 100 and the flexible PCB 300 and electrically connecting the display panel 100 and the flexible PCB 300. The connecting circuit 200 may be attached to the plurality of bonding pads in the non-display area N/A and may supply a source voltage, a data voltage and a gate voltage to the plurality of sub-pixels in the display area A/A through the plurality of bonding pads.

The connecting circuit 200 includes a base film 210, a driving chip 220 disposed on the base film 210 and a plurality of transmission lines (not shown) disposed on the base film 210 and transmitting a driving signal or a control signal.

The base film 210 supports the driving chip 220. The base film 210 may include an insulating material having a flexibility. For example, the base film 210 may include a polyimide (PI) resin or an epoxy resin.

The driving chip 220 processes an image data for displaying an image and the driving data for processing the image data. Although the driving chip 220 of a chip on film (COF) type is shown in FIGS. 1A and 1B, the driving chip 220 may have a chip on glass (COG) type and a tape carrier package (TCP) type in another embodiment. The type of the driving chip 220 is not limited thereto.

Although not shown in FIGS. 1A and 1B, the connecting circuit 200 may further include the plurality of transmission lines disposed on at least one surface of the base film 210. The plurality of transmission lines may transmit the image data and a driving data inputted from the flexible PCB 300 to the driving chip 220 and may transmit a data signal and the control signal outputted from the driving chip 220 to the display panel 100. The plurality of transmission lines may have a wave shape or a diamond shape for reducing or minimizing a damage due to a stretching.

In the connecting circuit 200, the base film 210 may be divided such that a region of the base film 210 corresponds to the stretchable display panel 100. For example, the base film 210 of the connecting circuit 200 may be divided into a plurality of sub-films corresponding to the plurality of transmission lines, respectively, on the base film 210.

The flexible PCB 300 may include a control unit such as a chip and a driver for controlling a driving of the circuit unit on the display panel 100 and the driving chip 220 on the connecting circuit 200. The flexible PCB 300 receives the image data and the driving data from an exterior and outputs the image data and the driving data to the connecting circuit 200. The connecting circuit 200 converts the image data and the driving data into a data signal and a driving control signal and outputs the data signal and the driving control signal to the display panel 100. The flexible PCB 300 may further include a memory and a processor.

In the stretchable display device 1000 according to the first embodiment of the present disclosure, since the base film 210 of the connecting circuit 200 is divided into the plurality of sub-films corresponding to the plurality of transmission lines, respectively, on the base film 210, the connecting circuit 200 is deformed to correspond to the stretched display panel 100. As a result, a stress of the connecting circuit 200 due to stretching of the display panel 100 is reduced or minimized.

The stretchable display device 1000 will be illustrated in detail hereinafter. A structure of the stretchable display panel 100 of the stretchable display device 1000 will be illustrated.

Figure 2:
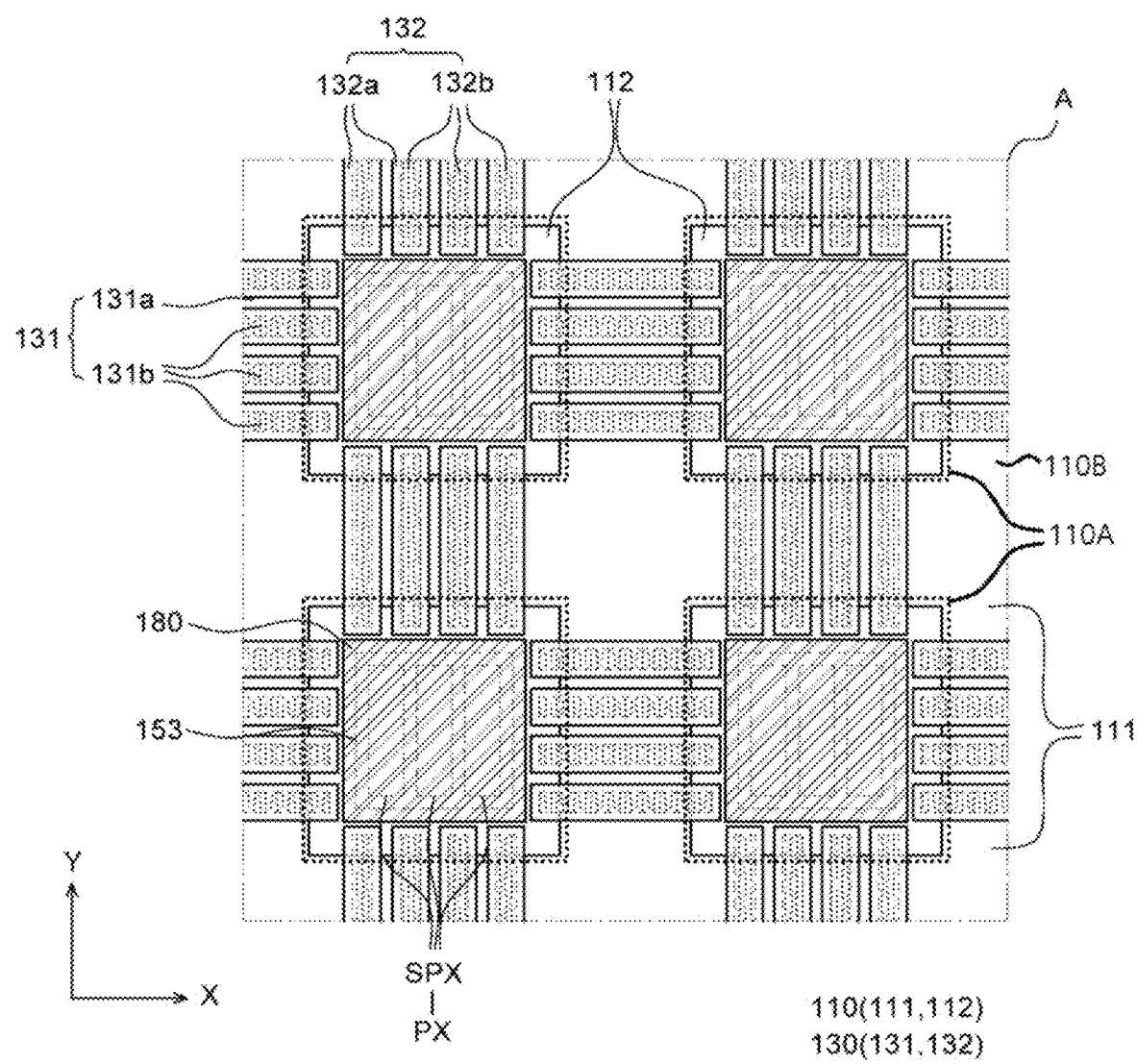
FIG. 2 is a magnified plan view of an A region of FIG. 1B.

FIG. 2 is a magnified plan view of an A region of FIG. 1B.

Figure 3:
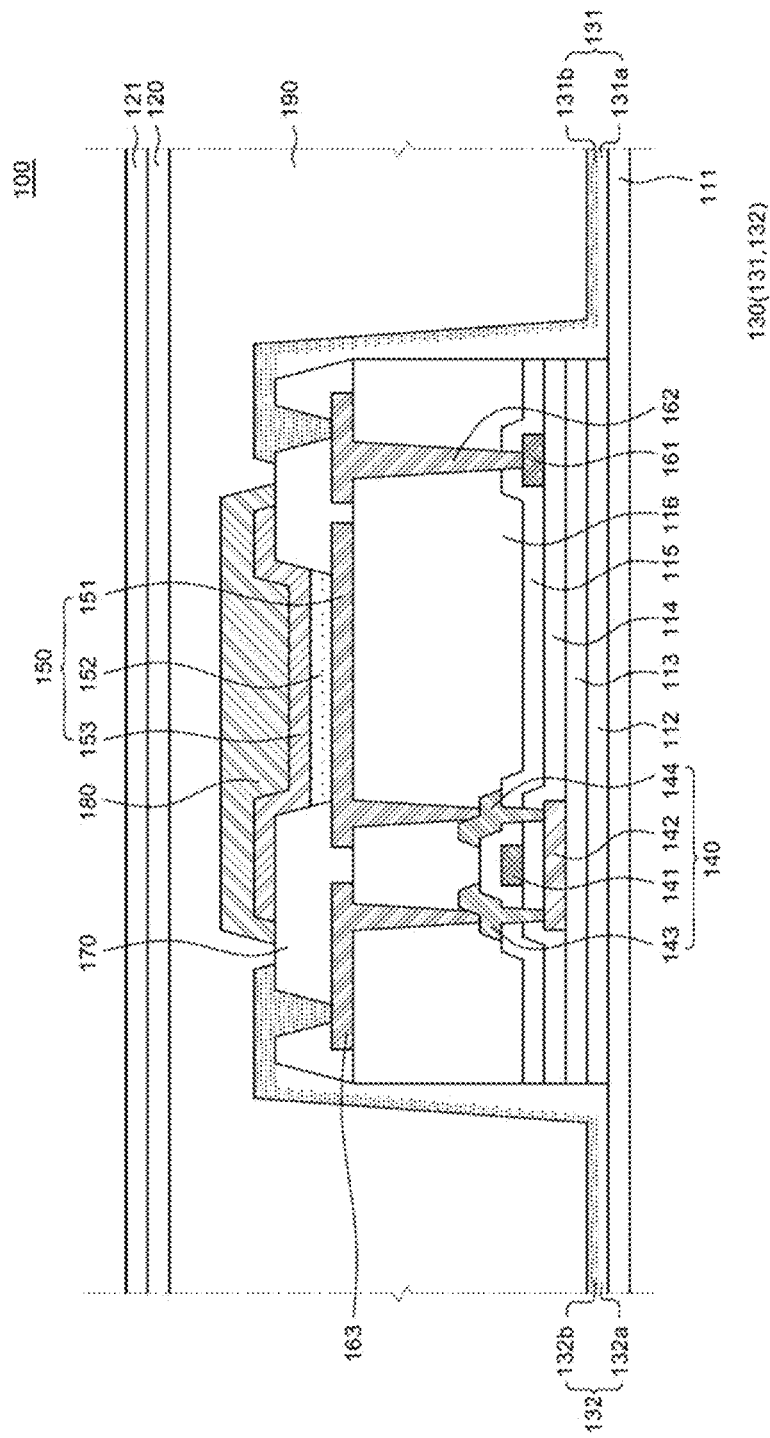
FIG. 3 is a cross-sectional view showing a sub-pixel of a stretchable display device according to a first embodiment of the present disclosure.

In FIG. 2, the first substrate 110 of the stretchable display device 1000 includes the lower substrate 111, the plurality of island substrates 112 and a connection line 130 (of FIG. 3).

The lower substrate 111 supports and protects elements of the stretchable display device 100. The lower substrate 111 of a ductile substrate may include an insulating material capable of being bent or stretched. For example, the lower substrate 111 may include a silicone rubber such as polydimethylsiloxane (PDMS) or an elastomer such as polyurethane (PU). However, a material for the lower substrate 111 is not limited thereto.

The lower substrate 111 may have a modulus of about 1 MPa to about 999 MPa (several MPa to several hundred MPa). The lower substrate 111 may have a stretching failure rate equal to or greater than about 100% and may have a thickness of about 10 μm to about 1 mm. However, the modulus, the stretching failure rate and the thickness of the lower substrate 111 is not limited thereto.

The plurality of island substrates 112 are disposed on the lower substrate 111. The plurality of island substrates 112 are a stiff substrate having a greater rigidity as compared with the lower substrate 111. The plurality of island substrates 112 are spaced apart from each other. The plurality of island substrates 112 has a lower elasticity and a higher rigidity as compared with the lower substrate 111. Although a modulus of the plurality of island substrates 112 may be greater than 1000 times of a modulus of the lower substrate 111, the modulus of the plurality of island substrates 112 is not limited thereto. The plurality of island substrates 112 may include a plastic material having a flexibility. For example, the plurality of island substrates 112 may include a polyimide (PI) resin or an epoxy resin.

Since the lower substrate 111 and the plurality of island substrates 112 have different rigidities, the lower substrate 111 and the plurality of island substrates 112 have different moduli. As a result, the first substrate 110 of the stretchable display device 1000 includes a first region 110A and a second region 110B having different moduli.

The plurality of island substrates 112 are disposed in the first region 110A and are not disposed in the second region 110B. The first region 110A may have a higher modulus than the second region 110B. A modulus is a coefficient of elasticity representing a ratio of a deformation with respect to a stress applied to a substrate. As the modulus increases, the rigidity increases. As a result, the first region 110A is a rigid region having a higher rigidity than the second region 110B. The plurality of pixels PX each having the plurality of sub-pixels SPX may be disposed on the plurality of island substrates 112, respectively, in the first region 110A. A structure of each sub-pixel SPX will be illustrated with reference to FIG. 3.

A connection line 130 is disposed between the plurality of island substrates 112 in the second region 110B. The connection line 130 is disposed between a plurality of pads on the plurality of island substrates 112 to electrically connect the plurality of pads.

The connection line 130 may include a first connection line 131 and a second connection line 132. The first connection line 131 is disposed along an x-axis in the display panel 100, and the second connection line 132 is disposed along a y-axis in the display panel 100. Although the connection line 130 has a straight line shape in FIG. 2, a shape of the connection line 130 is not limited thereto and the connection line 130 may have a wave shape or a diamond shape for preventing a damage of the connection line 130 due to a stretching of the display panel 100.

In an organic light emitting diode display device according to the related art, conductive lines such as a plurality of gate lines and a plurality of data lines extend between a plurality of sub-pixels and the plurality of sub-pixels are connected to one conductive line. As a result, in the organic light emitting diode display device according to the related art, the conductive lines such as the gate line, the data line, a high level voltage line and a reference voltage line extend on a substrate without discontinuity from one end portion to the other end portion of the organic light emitting diode display device.

In the stretchable display device 1000 according to the first embodiment of the present disclosure, conductive lines such as a gate line, a data line, a high level voltage line and a reference voltage line including a metallic material are selectively (locally) disposed on the plurality of island substrates 112. As a result, in the stretchable display device 1000, the conductive lines of a metallic material are disposed on the plurality of island substrates 112 and do not contact the lower substrate 111. Accordingly, the conductive lines are patterned to correspond to the plurality of island substrates 112 and are discontinuously disposed.

In the stretchable display device 1000, the pads on the two adjacent island substrates 112 may be connected to each other through the connection line 130 for connecting the discontinuous conductive lines. The connection line 130 electrically connects the pads on the two adjacent island substrates 112. For example, the gate line may be disposed on each of the plurality of island substrates 112 along the x-axis, and gate pads may be disposed at both end portions of the gate line on each of the plurality of island substrates 112. The two gate pads may be electrically connected to each other through the connection line 130 between one island substrate 112 and another island substrate 112 adjacent to each other. Here, the connection line 130 extending along the x-axis may function as a gate line transmitting a gate signal. Although the first connection line 131 may function as a gate line in FIG. 2, a function of the first connection line 131 is not limited thereto and the first connection line 131 may function as a low level voltage line.

The second connection line 132 may connect the pads on the two adjacent island substrates along the y-axis. Although the second connection line 132 may function as a data line, a high level voltage line or a reference voltage line in FIG. 2, a function of the second connection line 132 is not limited thereto.

For example, the connection line 130 may include base polymers 131a and 132a and conductive particles 131b and 132b dispersed in the base polymers 131a and 132a. The base polymers 131a and 132a may be disposed to overlap the conductive particles 131b and 132b and may be separated from each other to correspond to respective conductive paths. Although the base polymers 131a and 132a are separated from each other to correspond to respective conductive paths in FIG. 2, the disposition of the base polymers 131a and 132a is not limited thereto and a plurality of conductive paths may be disposed on one base polymer 131a and 132a.

Similarly to the lower substrate 111, the base polymers 131a and 132a may include an insulating material capable of being bent or stretched. For example, the base polymers 131a and 132a may include styrene butadiene styrene (SBS). However, a material for the base polymers 131a and 132a is not limited thereto. As a result, a crack of the connection line 130 due to a bending or a stretching of the lower substrate 111 is reduced or minimized.

The base polymers 131a and 132a contact a top surface and a side surface of a bank, a planarizing layer, an interlayer insulating layer and a buffer layer on the plurality of island substrates 112 and a side surface of the plurality of island substrates 112 and extend to a top surface of the lower substrate 111. The base polymers 131a and 132a may contact connection pads on the adjacent island substrates 112. As a result, the base polymers 131a and 132a may contact the top surface of the lower substrate 111, the side surface of the adjacent island substrate 112 and the buffer layer, the gate insulating layer, the interlayer insulating layer, the planarizing layer and the side surface of the bank on the island substrate 112. The base polymers 131a and 132a may contact the connection pads on the adjacent island substrates 112.

The conductive particles 131a and 132a may be disposed to be dispersed in the base polymers 131a and 132a and may constitute a conductive path electrically connecting the connection pads on the adjacent island substrates 112. The conductive particles 131a and 132b may connect the gate pad on the island substrate 112 at an outermost portion of the display area A/A and a gate signal pad in the non-display area N/A to constitute a conductive path.

Although the connection line 130 extends as a straight line in FIGS. 1B and 2, a shape of the connection line 130 is not limited thereto. Since the connection line 130 is disposed in the second region 110B to be contracted and stretched according to contraction and stretching of the lower substrate 111, the connection line 130 may have a wave shape or a diamond shape. The connection line 130 may have a shape where a crack is prevented even when the lower substrate 111 is contracted. As a result, generation of a crack in the connection line 130 is reduced or minimized when the lower substrate 111 is bent, stretched or contracted.

For bending or stretching the stretchable display device easily, a substrate having a ductile property of a relatively low modulus has been used for the stretchable display device. However, the material having a relatively low modulus is vulnerable to a heat. As a result, when a ductile material of a relatively low modulus such as polydimethylsiloxane (PDMS) is used for a substrate of a display device where the pixel is disposed, the substrate may be deteriorated due to a heat of a relatively high temperature, for example, a heat of a temperature over about 100° C. generated during a process of forming a transistor and a display element.

When the pixel is disposed on a substrate of a material resistant to a relatively high temperature, deterioration of the substrate is prevented during a process of forming the pixel. As a result, a material such as polyimide (PI) resistant to a relatively high temperature has been used for the substrate of the stretchable display device. However, since the material resistant to a relatively high temperature has a relatively high modulus and does not have a ductile property, the substrate may not be bent or stretched while the stretchable display device is stretched.

In the stretchable display device 1000 according to the first embodiment of the present disclosure, since the pixel having the transistor and the light emitting diode is disposed on the plurality of island substrates 112 of a stiff material, deterioration of the plurality of island substrates 112 due to a heat of a relatively high temperature is prevented during a process of forming the pixel.

Further, the lower substrate 111 of a ductile material is disposed under the plurality of island substrates 112. Since a first region of the lower substrate 111 except for a second region overlapping the plurality of island substrates 112 is easily bent or stretched, the stretchable display device 1000 having an excellent flexibility is obtained. Since the transistor and the light emitting diode are disposed on the plurality of island substrates 112 of a stiff material, deterioration of the transistor and the light emitting diode due to bending or stretching of the stretchable display device 1000 is prevented.

A structure of the sub-pixel SPX of the stretchable display device 1000 will be illustrated in detail hereinafter.

FIG. 3 is a cross-sectional view showing a sub-pixel of a stretchable display device according to a first embodiment of the present disclosure.

In FIG. 3, the buffer layer 113 is disposed on the plurality of island substrates 112. The buffer layer 113 protects the elements in the stretchable display device 1000 from penetration of a moisture and an oxygen of an exterior. The buffer layer 113 may include an insulating material. For example, the buffer layer 113 may have a single layered structure or a multiple layered structure of an inorganic material such as silicon nitride (SiNx), silicon oxide (SiOx) and silicon oxynitride (SiON).

The buffer layer 113 may be selectively (locally) disposed on the plurality of island substrates 112. Since the buffer layer 113 includes an inorganic material, the buffer layer 113 may be deteriorated to have a crack while the stretchable display device 1000 is stretched. The buffer layer 113 is not disposed in a region (second region 110B) between the plurality of island substrates 112 and is patterned to have a shape similar to the plurality of island substrates 112 on the plurality of island substrates 112. Since the buffer layer 113 is selectively (locally) disposed on the plurality of island substrates 112 of a stiff material, deterioration of the buffer layer 113 is prevented even when the stretchable display device 1000 is bent or stretched.

A transistor 140 including a gate electrode 141, an active layer 142, a source electrode 143 and a drain electrode 144 is disposed on the buffer layer 113. For example, the active layer 142 is formed on the buffer layer 113, and a gate insulating layer 114 for insulating the active layer 142 and the gate electrode 141 is formed on the gate insulating layer 114. A gate electrode 141 is formed on the gate insulating layer 114. An interlayer insulating layer 115 for insulating the gate electrode 141 and the source and drain electrodes 143 and 144 is formed on the gate electrode 141, and the source and drain electrodes 143 and 144 are formed on the interlayer insulating layer 115.

The gate insulating layer 114 and the interlayer insulating layer 115 are patterned to be selectively (locally) disposed over the plurality of island substrates 112. Since the gate insulating layer 114 and the interlayer insulating layer 115 have an inorganic material similarly to the buffer layer 113, the gate insulating layer 114 and the interlayer insulating layer 115 may be deteriorated to have a crack while the stretchable display device 1000 is stretched. The gate insulating layer 114 and the interlayer insulating layer 115 are not disposed in a region (second region 110B) between the plurality of island substrates 112 and are patterned to have a shape similar to the plurality of island substrates 112 on the plurality of island substrates 112.

Although a driving transistor among various transistors of the stretchable display device 1000 is shown in FIG. 3 for convenience of illustration, the stretchable display device 1000 may further include a switching transistor and a capacitor. Although the transistor 140 has a coplanar type in FIG. 3, the type of the transistor 140 is not limited thereto and the transistor 140 may have a staggered type.

A gate pad 161 is disposed on the gate insulating layer 114. The gate pad 161 transmits a gate signal to the plurality of sub-pixels SPX. Although the gate pad 161 may include the same material as the gate electrode 141, the material of the gate pad 161 is not limited thereto.

A planarizing layer 116 is disposed on the transistor 140 and the interlayer insulating layer 115. The planarizing layer 116 planarizes an upper portion of the transistor 140. The planarizing layer 116 may have a single layered structure or a multiple layered structure and may include an organic material. For example, the planarizing layer 116 may include an organic material of an acrylic group. However, the material of the planarizing layer 116 is not limited thereto. The planarizing layer 116 may have a contact hole for electrically connecting the transistor 140 and an anode 151, a contact hole for electrically connecting a data pad 163 and the source electrode 143 and a contact hole for electrically connecting a connection pad 162 and the gate pad 161.

A passivation layer may be disposed between the transistor 140 and the planarizing layer 116. The passivation layer covers the transistor 140 to protect the transistor 140 from penetration of a moisture and an oxygen. The passivation layer may include an inorganic material and may have a single layered structure or a multiple layered structure. However, the material and the structure of the passivation layer are not limited thereto.

A data pad 163, a connection pad 162 and a light emitting diode 150 are disposed on the planarizing layer 116.

The data pad 163 may transmit a data signal from the connection line 130 functioning as a data line to the plurality of sub-pixels SPX. The data pad 163 is connected to the source electrode 143 of the transistor 140 through the contact hole of the planarizing layer 116. Although the data pad 163 may include the same material as the anode 151 of the light emitting diode 150, the material of the data pad 163 is not limited thereto. In another embodiment, the data pad 163 may be disposed on the interlayer insulating layer 115 instead of the planarizing layer 116 and may include the same material as the source and drain electrodes 143 and 144 of the transistor 140.

The connection pad 162 may transmit a gate signal from the connection line 130 functioning as a gate line to the plurality of sub-pixels SPX. The connection pad 162 is connected to the gate pad 161 through the contact hole of the planarizing layer 116 and the interlayer insulating layer 115. Although the connection pad 162 may include the same material as the data pad 163, the material of the connection pad 162 is not limited thereto.

The light emitting diode 150 is disposed to correspond to each of the plurality of sub-pixels SPX and emits a light of a predetermined wavelength band. For example, the light emitting diode may emit a light of one of red, green, blue and white colors. However, the color of the light emitted from the light emitting diode is not limited thereto. When the light emitting diode 150 emits a light of a white color, the stretchable display device 1000 may further include a color filter layer.

The light emitting diode 150 includes an anode 151, an emitting layer 152 and a cathode 153. The anode 151 is disposed on the planarizing layer 116. The anode 151 supplies a hole to the emitting layer 152. The anode 151 may include a transparent conductive material having a relatively high work function. For example, the transparent conductive material may include indium tin oxide (ITO), indium zinc oxide (IZO) and indium tin zinc oxide (ITZO). The anode 151 may include the same material as the data pad 163 and the gate pad 161 on the planarizing layer 116. However, the material of the anode is not limited thereto. When the stretchable display device 1000 has a top emission type, the anode 151 may further include a reflective plate.

The anode 151 is disposed to be separated in each sub-pixel SPX and is electrically connected to the transistor 140 through the contact hole of the planarizing layer 116. Although the anode 151 is electrically connected to the drain electrode 144 in FIG. 3, the anode 151 may be electrically connected to the source electrode 143 in another embodiment.

A bank 170 is disposed on the anode 151, the data pad 163, the connection pad 162 and the planarizing layer 116. The plurality of sub-pixels SPX are divided by the bank 170. The bank 170 is disposed to cover both side portions of the anode 151 to expose a top surface of the anode 151. When a current is focused to an edge of the anode 151, a light may be emitted toward a side surface direction of the anode 151 to generate emission of the undesired sub-pixel SPX or mixture of colors. The bank 170 covers the edge of the anode 151 to prevent emission of the undesired sub-pixel SPX or mixture of colors. The bank 170 may include a resin of acrylic group, a resin of benzocyclobutene (BCB) group or polyimide (PI). However, the material of the bank 170 is not limited thereto.

The bank 170 has a contract hole for connecting the connection line 130 functioning as a data line and the data pad 163 and a contact hole for connecting the connection line 130 functioning as a gate line and the connection pad 162.

An emitting layer 152 emitting a light is disposed on the anode 151. The emitting layer 152 may include an emitting material such as a phosphorescent material or a fluorescent material. However, the material of the emitting layer 152 is not limited thereto.

The emitting layer 152 may include a single emitting material layer. Alternatively, the emitting layer 152 may have a stack structure including a plurality of emitting material layers. The emitting layer 152 may further include at least one of a hole transporting layer (HTL), an electron transporting layer (ETL), a hole blocking layer (HBL), an electron blocking layer (EBL), a hole injecting layer (HIL) and an electron injecting layer (EIL).

A cathode 153 is disposed on the emitting layer 152. The cathode 153 supplies an electron to the emitting layer 152. The cathode 153 may include a transparent conductive material such as indium tin oxide (ITO), indium zinc oxide (IZO), indium tin zinc oxide (ITZO), zinc oxide (ZnO) and tin oxide (TO) or an ytterbium (Yb) alloy. Alternatively, the cathode 153 may include a metallic material.

The cathode 153 may be patterned to overlap each of the plurality of island substrates 112. The cathode 153 may be selectively (locally) disposed on the plurality of island substrates 112 and may not be disposed in a region (second region 110B) between the plurality of island substrates 112. When the cathode 153 is disposed in a region between the plurality of island substrates 112, the cathode 153 including a transparent conductive material or a metallic material may be deteriorated while the stretchable display device 1000 is stretched. In the stretchable display device 1000, for preventing deterioration of the cathode, the cathode 153 may be disposed to correspond to each of the plurality of island substrates 112. The cathode 153 may be disposed over the plurality of island substrates 112 not to overlap the connection line 130.

In the stretchable display device 1000 according to the first embodiment of the present disclosure, the cathode 153 is patterned to correspond to the plurality of island substrates 112. As a result, a low level voltage may be independently supplied to the cathode 153 over the plurality of island substrates 112 through the connection line 130.

An encapsulating layer 180 is disposed on the light emitting diode 150. The encapsulating layer 180 covers the light emitting diode 150 and contacts a top surface of the bank 170 to encapsulate the light emitting diode 150. As a result, the encapsulating layer 180 protects the light emitting diode 150 from penetration of a moisture or an oxygen of an exterior or a physical impact.

The encapsulating layer 180 may cover the cathode 153 patterned to overlap each of the plurality of island substrates 112 and may be disposed over each of the plurality of island substrates 112. The encapsulating layer 180 may be disposed to cover one cathode 153 over one island substrate 112, and the encapsulating layers 180 over the plurality of island substrates 112 may be separated from each other.

The encapsulating layer 180 may be selectively (locally) disposed over the plurality of island substrates 112. When the encapsulating layer 180 includes an inorganic material, the encapsulating layer 180 may be deteriorated to have a crack while the stretchable display device 1000 is stretched. Specifically, since the light emitting diode 150 is vulnerable to a moisture or an oxygen, a reliability of the light emitting diode 150 is reduced when the encapsulating layer 180 is deteriorated.

In the stretchable display device 1000 according to the first embodiment of the present disclosure, since the encapsulating layer 180 is not disposed in a region (second region 110B) between the plurality of island substrates 112, deterioration of the encapsulating layer 180 may be reduced or minimized even when the stretchable display device 1000 is bent or stretched.

In the stretchable display device 1000 according to the first embodiment of the present disclosure, the plurality of island substrates 112 having a relatively high rigidity and spaced apart from each other are disposed on the lower substrate 111 having a relatively high ductility. In addition, the cathode 153 and the encapsulating layer 180 are patterned to correspond to each of the plurality of island substrates 112. As a result, when a user bends or stretches the stretchable display device 1000, the stretchable display device 1000 is easily deformed and deterioration of elements of the stretchable display device 1000 is reduced or minimized while the stretchable display device 1000 is deformed.

An adhesive layer 190, a second substrate 120 and a polarizing plate 121 are disposed on the encapsulating layer 180 over the first substrate 110.

The second substrate 120 supports various elements under the second substrate 120. The second substrate 120 may be attached to the first substrate 110 with the adhesive layer 190.

The polarizing plate 121 is disposed on the second substrate 120. The polarizing plate 121 may polarize a light incident to the stretchable display device 1000 from an exterior. The polarized light incident to an interior of the stretchable display device 1000 through the polarizing plate 121 may be reflected in the interior of the stretchable display device 1000 to have a polarization state different from a polarization state of the polarized light. As a result, the reflected light may not pass through the polarizing plate 121. Since the light incident to the stretchable display device 1000 from the exterior is not emitted to the exterior, a reflection of an external light in the stretchable display device 1000 may be reduced.

Although the stretchable display device 1000 includes the organic light emitting diode as an emitting element in FIG. 3, the stretchable display device 1000 may include a micro light emitting diode (LED) as an emitting element in another embodiment. A stretchable display device 1000 including sub-pixel having a micro LED as an emitting element will be illustrated hereinafter.

Figure 4:
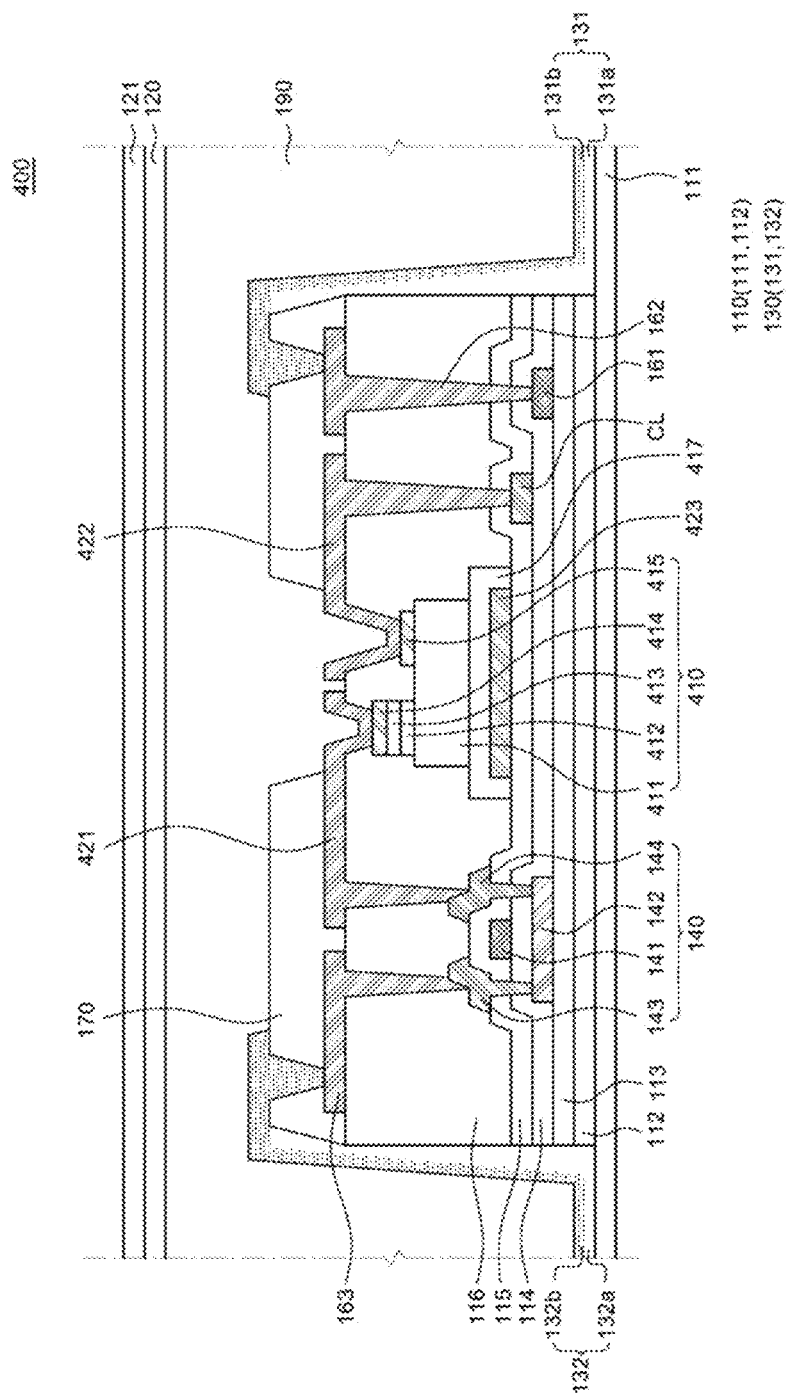
FIG. 4 is a cross-sectional view showing a sub-pixel of a stretchable display device according to a second embodiment of the present disclosure.

FIG. 4 is a cross-sectional view showing a sub-pixel of a stretchable display device according to a second embodiment of the present disclosure.

Since a structure of one sub-pixel of FIG. 4 is the same as a structure of one sub-pixel of FIG. 3 except for an emitting element, illustration on a part of the second embodiment the same as a part of the first embodiment is omitted.

In FIG. 4, a common line CL is disposed on a gate insulating layer 114. The common line CL supplies a common voltage to the plurality of sub-pixels SPX. Although the common line CL may include the same material as source and drain electrodes 143 and 144 of a transistor 140, the material of the common line CL is not limited thereto.

A reflecting layer 423 is disposed on an interlayer insulating layer 115. A light emitted from a micro light emitting diode (LED) 410 toward a first substrate 110 is reflected toward an upper portion of the stretchable display device 1000 by the reflecting layer 423 to be emitted to an exterior. The reflecting layer 423 may include a metallic material having a relatively high reflectance.

A first adhesive layer 417 is disposed on the reflecting layer 423 to cover the reflecting layer 423. The first adhesive layer 417 attaches the micro LED 410 to the reflecting layer 423. The first adhesive layer 417 may insulate the reflecting layer 423 of a metallic material and the micro LED 410. Although the first adhesive layer 417 may include a thermocurable material or a photo-curable material, the material of the first adhesive layer 417 is not limited thereto. Although the first adhesive layer 417 is disposed to selectively (locally) cover the reflecting layer 423 in FIG. 4, the disposition of the first adhesive layer 417 is not limited thereto.

The micro LED 410 is disposed on the first adhesive layer 417 to overlap the reflecting layer 423. The micro LED 410 includes a negative (n) type layer 411, an active layer 412, a positive (p) type layer 413, a positive (p) electrode 414 and a negative (n) electrode 415. Although the micro LED 410 has a lateral structure in FIG. 4, the structure of the micro LED 410 is not limited thereto.

The n type layer 411 is disposed on the first adhesive layer 417 to overlap the reflecting layer 423. The n type layer 411 may be formed by injecting a negative type impurity into gallium nitride (GaN) having an excellent crystallinity. The active layer 412 is disposed on then type layer 411. The active layer 412 emits a light and may include a nitride semiconductor such as indium gallium nitride (InGaN). The p type layer 413 is disposed on the active layer 412. The p type layer 413 may be formed by injecting a positive type impurity into gallium nitride (GaN). However, the material of the n type layer 411, the active layer 412 and the p type layer 413 is not limited thereto.

The p electrode 414 is disposed on the p type layer 413, and the n electrode 415 is disposed on the n type layer 411. The p electrode 414 and the n electrode 415 are spaced apart from each other. After the n type layer 411, the active layer 412 and the p type layer 413 may be sequentially formed on the first adhesive layer 417, the active layer 412 and the p type layer 413 may be etched, and then the n electrode 415 and the p electrode 414 may be formed on the n type layer 411 and the p type layer 413, respectively, to complete the micro LED 410. For separating the n electrode 415 and the p electrode 414, the active layer 412 and the p type layer 413 are patterned to expose the n type layer 411. As a result, the n electrode 415 and the p electrode 414 are disposed on a surface having a step difference instead of a flat surface. Since the p electrode 414 is disposed on the p type layer 413 and the n electrode 415 is disposed on the n type layer 411, the p electrode 414 and the n electrode 415 are disposed to be separated from each other and to have different heights from each other. The n electrode 415 and the p electrode 414 may include a conductive material such as a transparent conductive oxide. Although the n electrode 415 and the p electrode 414 may include the same material as each other, the material of the n electrode 415 and the p electrode 414 is not limited thereto.

A planarizing layer 116 is disposed on the interlayer insulating layer 114 and the first adhesive layer 417. The planarizing layer 116 planarizes an upper portion of the micro LED 410. The planarizing layer 116 may have a structure including at least two layers.

A first electrode 421 and a second electrode 422 are disposed on the planarizing layer 116. The first electrode 421 electrically connects the transistor 140 and the micro LED 410. The first electrode 421 is connected to the p electrode 414 through a contact hole in the planarizing layer 116. In addition, the first electrode 421 is connected to the drain electrode 144 of the transistor 140 through a contact hole in the planarizing layer 116 and the interlayer insulating layer 115. In another embodiment, the first electrode 421 may be connected to the source electrode 143 of the transistor 140 according to a type of the transistor 140. As a result, the p electrode 414 and the drain electrode 144 of the transistor 140 are electrically connected to each other through the first electrode 421.

The second electrode 422 electrically connects the micro LED 410 and a common line CL. The second electrode 422 is connected to the common line CL through a contact hole in the planarizing layer 116 and the interlayer insulating layer 115 and is connected to the n electrode 415 of the micro LED 410 through a contact hole in the planarizing layer 116. As a result, the common line CL and the n electrode 415 of the micro LED 410 are electrically connected to each other through the second electrode 422.

When the stretchable display device 1000 is turned on, voltages of different levels (different voltages) may be applied to the drain electrode 144 of the transistor 140 and the common line CL, respectively. The voltage applied to the drain electrode 144 of the transistor 140 may be applied to the first electrode 421, and a common voltage may be applied to the second electrode 422. The voltages of different levels may be applied to the p electrode 414 and the n electrode 415 through the first and second electrodes 421 and 422, thereby the micro LED emitting a light.

Although the transistor 140 is electrically connected to the p electrode 414 and the common line CL is electrically connected to the n electrode 415, the connection is not limited thereto. The transistor 140 may be electrically connected to the n electrode 415 and the common line CL may be electrically connected to the p electrode 414.

A bank 170 is disposed on the planarizing layer 116, the first electrode 421, the second electrode 422, the data pad 163 and the connection pad 162. The bank 170 may be disposed to overlap an end portion of the reflecting layer 423, and the other portion of the reflecting layer 423 not overlapping and exposed outside the bank 170 may be defined as an emission region. The bank 170 may include an organic insulating material and may include the same material as the planarizing layer 116. In addition, for preventing color mixture due to transmission of a light from the micro LED 410 to the adjacent sub-pixel SPX, the bank 170 may include a black colored material.

Although the stretchable display device 1000 includes an organic light emitting diode of an organic material in the first embodiment, the stretchable display device 1000 includes a micro LED of an inorganic material in the second embodiment. Since the micro LED 410 includes an inorganic material instead of an organic material, the micro LED 410 has a longer lifetime due to an excellent reliability as compared with a liquid crystal capacitor or an organic light emitting diode. The micro LED 410 may have a relatively high lighting speed, a low power consumption and an excellent stability due to a relatively high impact resistance and may display an image of a relatively high luminance due to an excellent emission efficiency. As a result, the micro LED 410 may be applied to an ultra large sized display device. Specifically, since the micro LED 410 includes an inorganic material instead of an organic material, an encapsulating layer may not be used. The encapsulating layer may be deteriorated to have a crack while the stretchable display device 1000 is stretched. In the stretchable display device 1000 according to the second embodiment of the present disclosure, since the micro LED 410 including an inorganic material is used as an emitting element, the encapsulating layer is omitted and deterioration of the encapsulating layer due to bending or stretching of the stretchable display device 1000 is prevented. In addition, since the micro LED 410 includes an inorganic material instead of an organic material, the stretchable display device 1000 is protected from a moisture or an oxygen to have an excellent reliability.

Although not shown, the stretchable display device 1000 may be a quantum dot display device or an electrophoretic display device.

Figure 5:
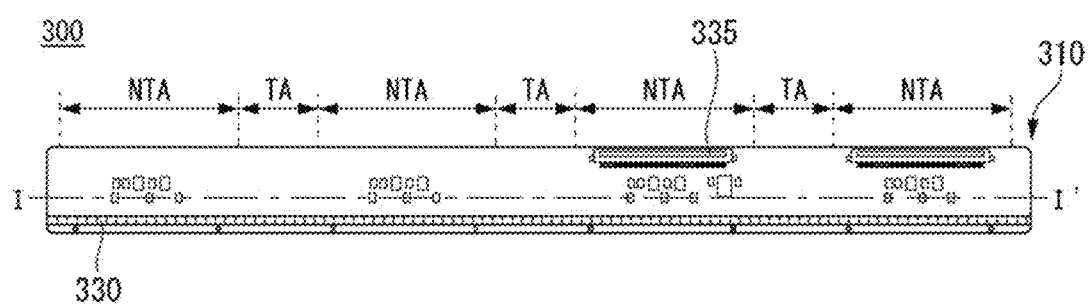
FIG. 5 is a plan view showing a flexible printed circuit board of a stretchable display device according to a first embodiment of the present disclosure.
Figure 6:
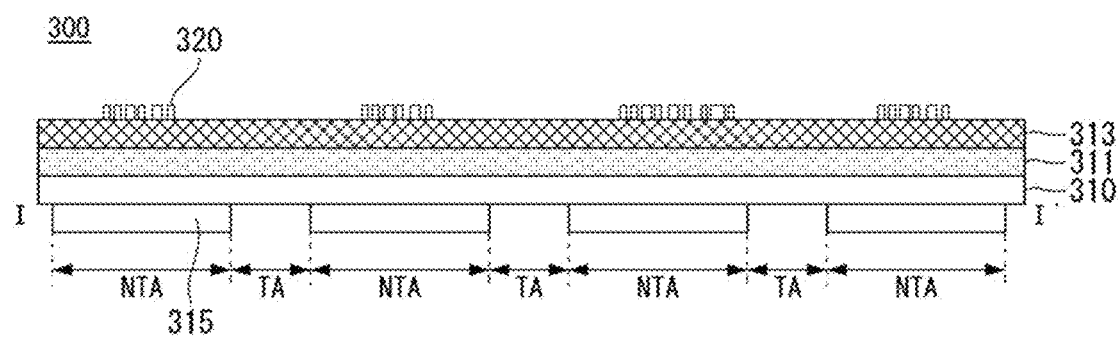
FIG. 6 is a cross-sectional view taken along a line I-I' of FIG. 5.

FIG. 5 is a plan view showing a flexible printed circuit board of a stretchable display device according to a first embodiment of the present disclosure, and FIG. 6 is a cross-sectional view taken along a line I-I' of FIG. 5.

In FIGS. 5 and 6, the flexible printed circuit board (PCB) 300 includes a base substrate 310. A plurality of signal lines electrically connecting a plurality of circuit components 320 for generating and/or supplying a predetermined signal may be disposed on the base substrate 310. For example, the flexible PCB 300 may include a control unit and passive elements on the base substrate 310. The control unit may include a chip and a circuit for driving the circuit unit on the display panel 100 and the driving chip 220 on the connecting circuit 200. The passive elements may include a capacitor and a resistor.

The flexible PCB 300 may include a main pad 330 and a connector 335 on the base substrate 310. The main pad 330 may be electrically connected to the connecting circuit 200. The main pad 330 and the connecting circuit 200 may be attached to each other through a bonding process. The signal line may connect the main pad 330 and the control unit and/or the passive elements. The connector 335 may be electrically connected to an external system through a flexible cable. Although the flexible cable may be a flexible flat cable (FFC), the type of the flexible cable is not limited thereto.

The flexible PCB 300 may include a conductive pattern layer 311 and a protecting layer 313 disposed between the circuit components 320 and the base substrate 310. The conductive pattern layer 311 may include conductive patterns of a single layered structure or a multiple layered structure. The conductive patterns may be disposed in different layers with at least one insulating layer interposed therebetween. The conductive pattern layer 311 may be electrically connected to the circuit components 320 and/or the signal line through at least one via hole. A protecting layer 313 is disposed to cover and protect the conductive pattern layer 311.

The base substrate 310 supports and protects various elements of the flexible PCB 300. The base substrate 310 of a ductile substrate may include an insulating material capable of being bent or stretched. For example, the base substrate 310 may include a silicone rubber such as polydimethylsiloxane (PDMS) or an elastomer such as polyurethane (PU). However, a material of the base substrate 310 is not limited thereto. The base substrate 310 may have a modulus of about 1 MPa to about 999 MPa (several MPa to several hundred MPa). The base substrate 310 may have a stretching failure rate equal to or greater than about 100%. Since the flexible PCB 300 include a material having an elasticity, a stress of the flexible PCB 300 due to stretching of the stretchable display device 1000 may be reduced or minimized.

The flexible PCB 300 may include non-deformation region NTA and deformation region TA. The circuit components 320 may be disposed in the non-deformation region NTA on the base substrate 310. In the non-deformation region NTA, stretching and contracting of the base substrate 310 may be limited. The deformation region TA is disposed outside the non-deformation region NTA, and the circuit components 320 may not be disposed in the deformation region TA. In the deformation region TA, the base substrate 310 may be easily stretched and contracted. Although the non-deformation region NTA and the deformation region TA may be alternately and sequentially disposed along one direction, a disposition of the non-deformation region NTA and the deformation region TA is not limited thereto.

The flexible PCB 300 may further include a plurality of stiffeners 315. Each of the plurality of stiffeners 315 may be disposed in the non-deformation region NTA. The plurality of stiffeners 315 may include a stiff material having a higher rigidity as compared with the base substrate 310.

The plurality of stiffeners 315 may have a smaller elasticity and a higher rigidity as compared with the base substrate 310. Although a modulus of the plurality of stiffeners 315 may be greater than 1000 times of a modulus of the base substrate 310, a modulus of the plurality of stiffeners 315 is not limited thereto. Although the plurality of stiffeners 315 may include a polyimide (PI) resin or an epoxy resin, a material of the plurality of stiffeners 315 is not limited thereto.

The plurality of stiffeners 315 are disposed in the non-deformation region NTA such that the non-deformation region NTA has a rigidity. Since the plurality of stiffeners 315 are selectively (locally) disposed in the non-deformation region NTA, the non-deformation region NTA and the deformation region TA may have different elasticities from each other. For example, the non-deformation region NTA where the plurality of stiffeners 315 are disposed may have a lower elasticity as compared with the deformation region TA. As a result, in the stretchable display device 1000, the flexible PCB 300 may have an elasticity to be stretched and contracted and deterioration such as detachment or destruction of the circuit components 320 may be prevented while the flexible PCB 300 is stretched and contracted.

The connecting circuit 200 and the flexible PCB 300 are boned in a bonding area of the non-deformation region NTA where the plurality of stiffeners 315 are disposed. For example, a bonding process of bonding the connecting circuit 200 and the flexible PCB 300 may be performed in the non-deformation region NTA having a rigidity. The circuit components 320 may be detached or destroyed due to an external force during the bonding process. In the stretchable display device 1000 according to the first embodiment of the present disclosure, since the main pad 330 of the flexible PCB 300 is selectively (locally) disposed in the non-deformation region NTA, deterioration such as detachment or destruction of the circuit components 320 may be reduced or minimized while the connecting circuit 200 and the flexible PCB 300 are bonded.

FIG. 7A to 7D are perspective views showing a plurality of stiffeners of a flexible display device according to a first embodiment of the present disclosure.

Figure 7A:
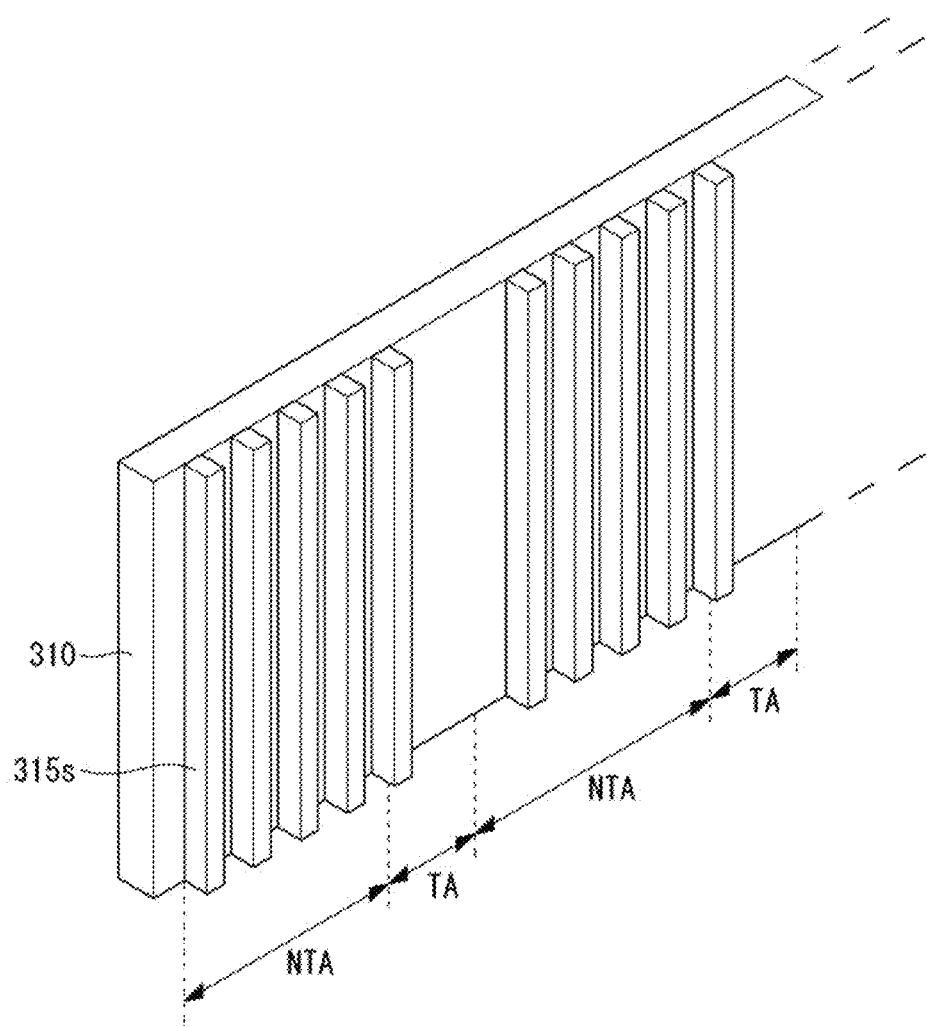
FIG. 7A to 7D are perspective views showing a plurality of stiffeners of a flexible display device according to a first embodiment of the present disclosure.

In FIG. 7A, the stiffener 315 may be divided in the non-deformation region NTA. For example, one stiffener 315 may be divided into a plurality of sub-stiffeners 315s in one non-deformation region NTA. The adjacent stiffeners 315s may be separated to expose the base substrate 310 by a predetermined distance along a first direction X and/or a second direction Y. Since the non-deformation region NTA has an elasticity due to exposition of the base substrate 310, deformation of the deformation region TA may not be excessively limited by the non-deformation region NTA while the flexible PCB 300 is stretched and contracted.

Figure 7B:
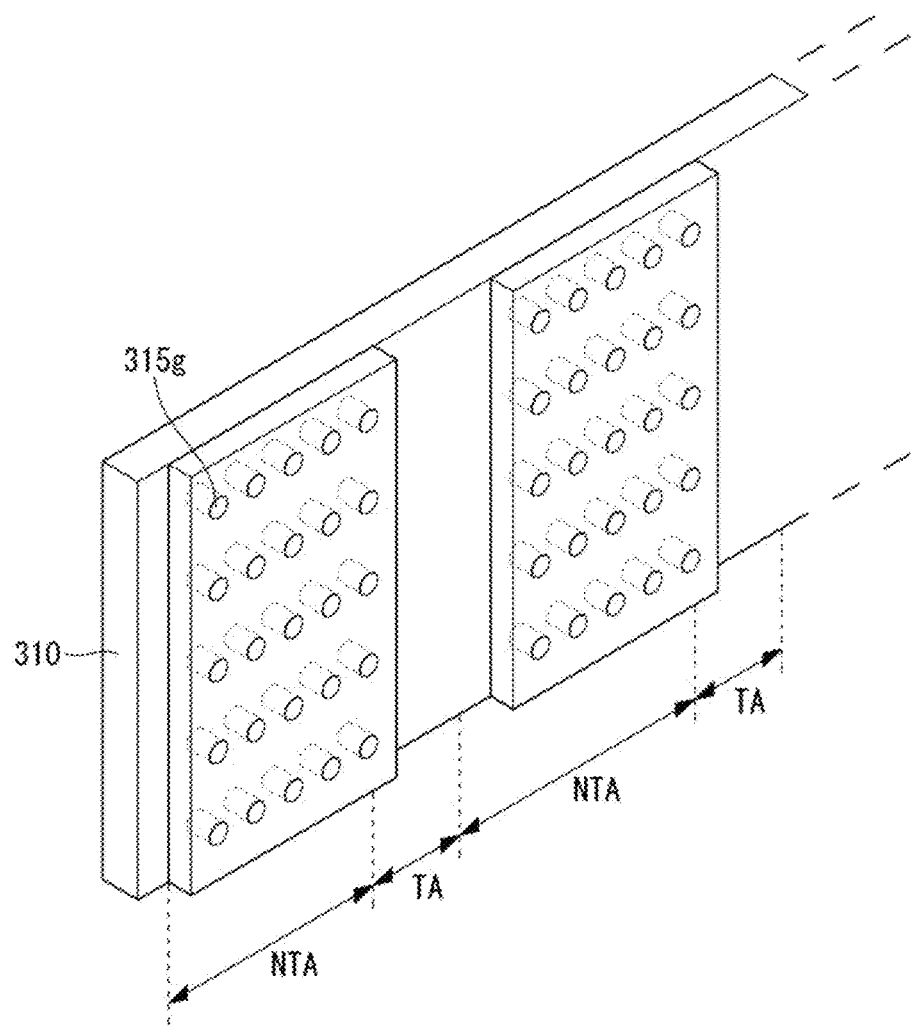

In FIG. 7B, the stiffener 315 may include a plurality of openings 315g. Each opening 315g may have a hole shape completely penetrating the stiffener 315 or may have a groove shape where a portion of the stiffener 315 is removed such that the base substrate 310 is partially exposed through the stiffener 315. Since the non-deformation region NTA has an elasticity due to exposition, deformation of the deformation region TA may not be excessively limited by the non-deformation region NTA while the flexible PCB 300 is stretched and contracted.

Figure 7C:
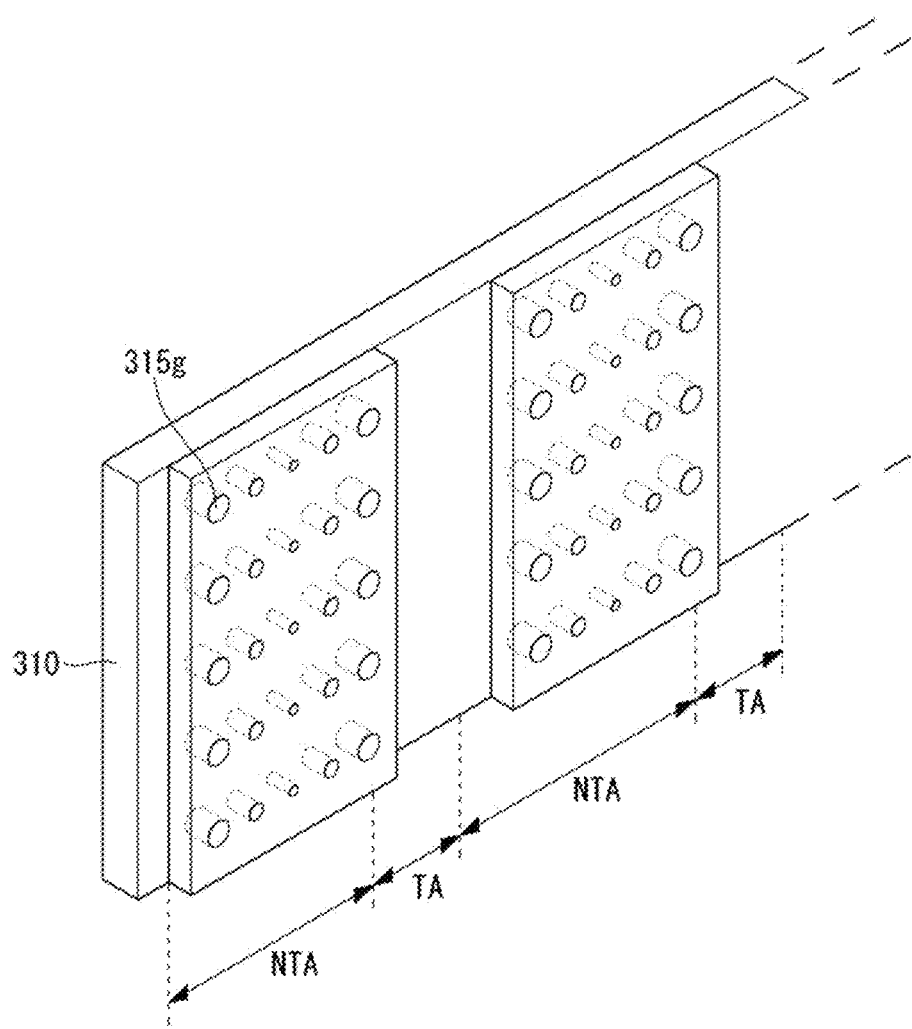
Figure 7D:
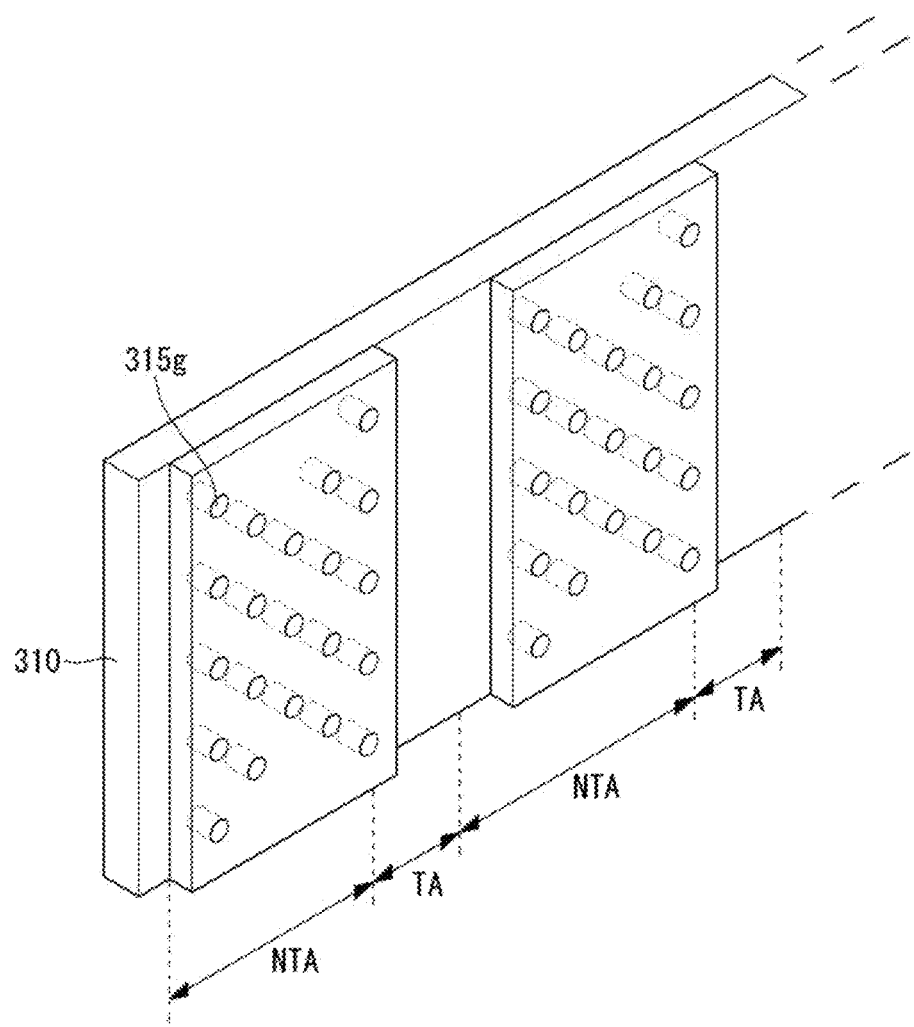

In FIGS. 7C and 7D, the stiffener 315 may include a plurality of openings 315g. Each opening 315g may have a hole shape completely penetrating the stiffener 315 or may have a groove shape where a portion of the stiffener 315 is removed such that the base substrate 310 is partially exposed through the stiffener 315.

The plurality of openings 315g may have different areas according to a position. For example, as in FIG. 7C, as each opening 315g is disposed farther from the deformation region TA, an area of each opening 315g may gradually decrease. The plurality of openings 315g may have different densities according to a position. For example, as in FIG. 7D, as the opening 315g is disposed farther from the deformation region TA, a density of the openings 315g may gradually decrease. As a result, focus of a stress at a border between the deformation region TA and the non-deformation region NTA may be effectively prevented while the flexible PCB 300 is stretched and contracted.

Figure 8A:
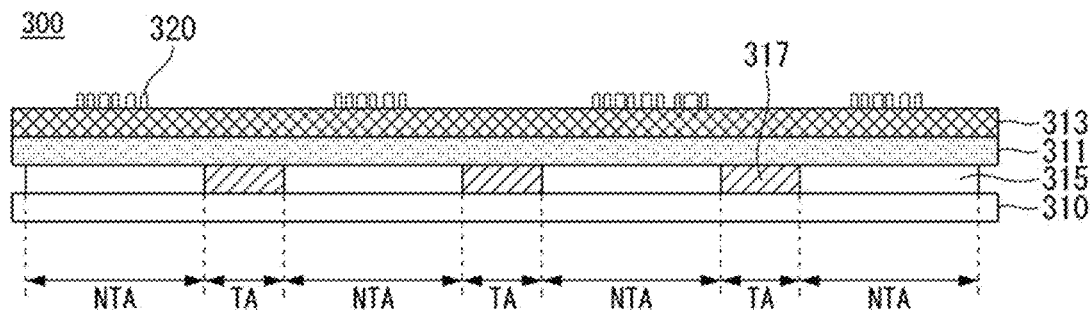
FIG. 8A to 8C are cross-sectional views showing a flexible printed circuit board of a stretchable display device according to third to fifth embodiments, respectively, of the present disclosure.
Figure 8B:
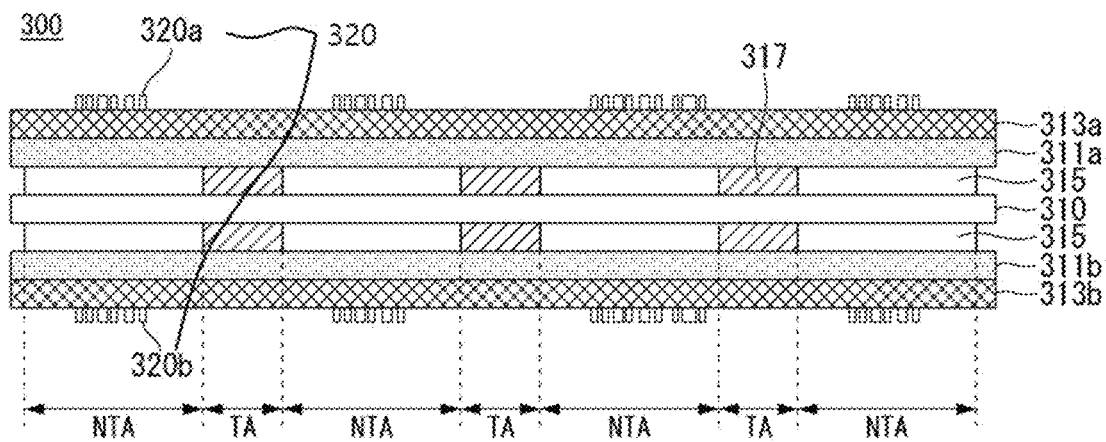
Figure 8C:
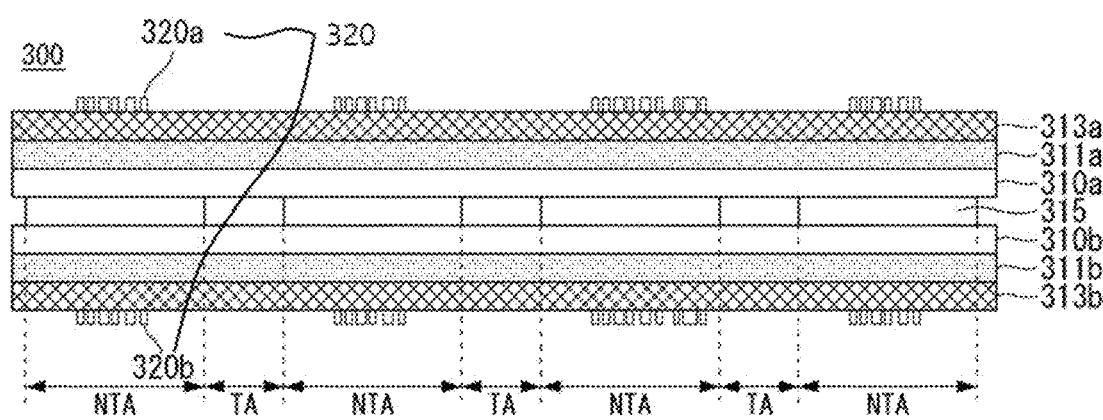

FIG. 8A to 8C are cross-sectional views showing a flexible printed circuit board of a stretchable display device according to third to fifth embodiments, respectively, of the present disclosure.

In FIG. 6, the base substrate 310 may have first and second surfaces opposite to each other. The circuit components 320 may be disposed on the first surface of the base substrate 310, and the plurality of stiffeners 315 may be disposed on the second surface of the base substrate 310.

In FIG. 8A, the base substrate 310 may have first and second surfaces opposite to each other. The circuit components 320 may be disposed over the first surface of the base substrate 310. The conductive pattern layer 311 may be disposed between the circuit components 320 and the first surface of the base substrate 310. The plurality of stiffeners 315 may be disposed between the conductive pattern layer 311 and the first surface of the base substrate 310. Since the plurality of stiffeners 315 is disposed adjacent to the circuit components 320, deterioration of the circuit components 320 may be further effectively prevented while the flexible PCB 300 is stretched and contracted.

The flexible PCB 300 may further include a filling layer 317 disposed between the adjacent stiffeners 315. The filling layer 317 may be disposed in the deformation region TA to compensate a step difference generated by the plurality of stiffeners 315.

The filling layer 317 of a ductile material may include an insulating material capable of being bent or stretched. The filling layer 317 may include the same material as the base substrate 310. For example, the filling layer 317 may include a silicone rubber such as polydimethylsiloxane (PDMS) or an elastomer such as polyurethane (PU). The plurality of stiffeners 315 may have a higher rigidity as compared with the filly layer 317.

In FIG. 8B, the base substrate 310 may have first and second surfaces opposite to each other. The circuit components 320 may include first circuit components 320a disposed over the first surface of the base substrate 310 and second circuit components 320b disposed over the second surface of the base substrate 310. A first conductive pattern layer 311a and a first protecting layer 313a may be sequentially disposed between the first circuit components 320a and the first surface of the base substrate 310, and a second conductive pattern layer 311b and a second protecting layer 313b may be sequentially disposed between the second circuit components 320b and the second surface of the base substrate 310. The plurality of stiffeners 315 may be disposed between the first conductive pattern layer 311a and the first surface of the base substrate 310 and/or between the second conductive pattern layer 311b and the second surface of the base substrate 310. A filling layer 317 may be disposed between the adjacent stiffeners 315.

In FIG. 8C, the flexible PCB 300 may include a first base substrate 310a and a second base substrate 310b. Each of the first the base substrate 310a and the second base substrate 310b may have first and second surfaces opposite to each other. The second surface of the first base substrate 310a and the second surface of the second base substrate 310b may face into each other. The circuit components 320 may include first circuit components 320a disposed over the first surface of the first base substrate 310a and second circuit components 320b disposed over the first surface of the second base substrate 310b. A first conductive pattern layer 311a and a first protecting layer 313a may be sequentially disposed between the first circuit components 320a and the first surface of the first base substrate 310a, and a second conductive pattern layer 311b and a second protecting layer 313b may be sequentially disposed between the second circuit components 320b and the first surface of the second base substrate 310b. The plurality of stiffeners 315 may be disposed between the first base substrate 310a and the second base substrate 310b.

In the stretchable display device 1000 according to the first to fifth embodiments of the present disclosure, since the flexible PCB 300 has an elasticity, deformation such as stretching and contracting of the display panel is not excessively limited by the flexible PCB 300 and an excellent stretchable display device is provided. Further, the flexible PCB 300 has an elasticity and deterioration of the circuit components 320 due to an external force is prevented while the flexible PCB 300 is stretched and contracted.

Figure 9:
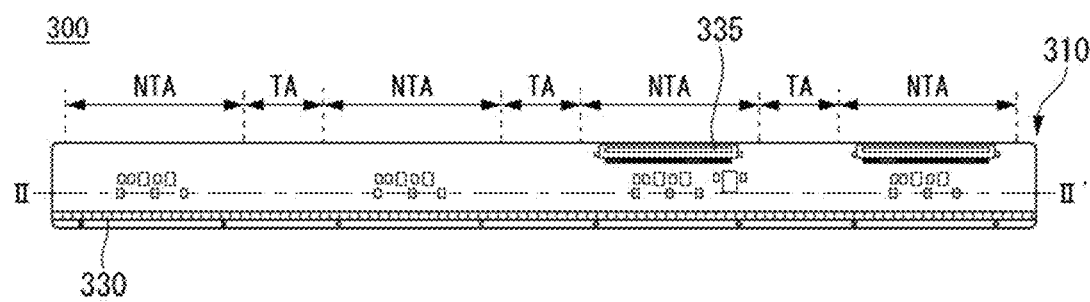
FIG. 9 is a plan view showing a flexible printed circuit board of a stretchable display device according to a sixth embodiment of the present disclosure.
Figure 10:
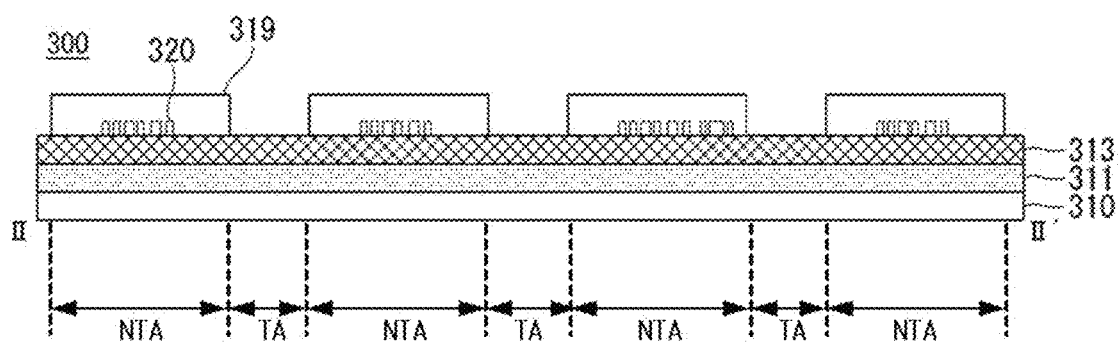
FIG. 10 is a cross-sectional view taken along a line II-II' of FIG. 9.

FIG. 9 is a plan view showing a flexible printed circuit board of a stretchable display device according to a sixth embodiment of the present disclosure, and FIG. 10 is a cross-sectional view taken along a line II-II' of FIG. 9. Illustration on parts of the sixth embodiment the same as those of the first embodiment will be omitted.

In FIGS. 9 and 10, the flexible printed circuit board (PCB) 300 includes a base substrate 310. A plurality of signal lines electrically connecting a plurality of circuit components 320 for generating and/or supplying a predetermined signal may be disposed on the base substrate 310. For example, the flexible PCB 300 may include a control unit and passive elements on the base substrate 310. The control unit may include a chip and a circuit for driving the circuit unit on the display panel 100 and the driving chip 220 on the connecting circuit 200. The passive elements may include a capacitor and a resistor.

The flexible PCB 300 may include a main pad 330 and a connector 335 on the base substrate 310. The main pad 330 may be electrically connected to the connecting circuit 200. The main pad 330 and the connecting circuit 200 may be attached to each other through a bonding process. The signal line may connect the main pad 330 and the control unit and/or the passive elements. The connector 335 may be electrically connected to an external system through a flexible cable. Although the flexible cable may be a flexible flat cable (FFC), the type of the flexible cable is not limited thereto.

The flexible PCB 300 may include a conductive pattern layer 311 and a protecting layer 313 disposed between the circuit components 320 and the base substrate 310. The conductive pattern layer 311 may include conductive patterns of a single layered structure or a multiple layered structure. The conductive patterns may be disposed in different layers with at least one insulating layer interposed therebetween. The conductive pattern layer 311 may be electrically connected to the circuit components 320 and/or the signal line through at least one via hole. A protecting layer 313 is disposed to cover and protect the conductive pattern layer 311.

The base substrate 310 supports and protects various elements of the flexible PCB 300. The base substrate 310 of a ductile substrate may include an insulating material capable of being bent or stretched. For example, the base substrate 310 may include a silicone rubber such as polydimethylsiloxane (PDMS) or an elastomer such as polyurethane (PU). However, a material for the base substrate 310 is not limited thereto. The base substrate 310 may have a modulus of about 1 MPa to about 999 MPa (several MPa to several hundred MPa). The base substrate 310 may have a stretching failure rate equal to or greater than about 100%. Since the flexible PCB 300 include a material having an elasticity, a stress of the flexible PCB 300 due to stretching of the stretchable display device 1000 may be reduced or minimized.

The flexible PCB 300 may include non-deformation region NTA and deformation region TA. The circuit components 320 may be disposed in the non-deformation region NTA on the base substrate 310. In the non-deformation region NTA, stretching and contracting of the base substrate 310 may be limited. The deformation region TA is disposed outside the non-deformation region NTA, and the circuit components 320 may not be disposed in the deformation region TA. In the deformation region TA, the base substrate 310 may be easily stretched and contracted. Although the non-deformation region NTA and the deformation region TA may be alternately and sequentially disposed along one direction, a disposition of the non-deformation region NTA and the deformation region TA is not limited thereto.

The flexible PCB 300 may further include a plurality of cover layers 319. Each of the plurality of cover layers 319 may be disposed on the circuit components 320 in the non-deformation region NTA. The plurality of cover layers 319 may cover the circuit components 320 to prevent deterioration such as detachment or destruction of the circuit components 320 while the flexible PCB 300 is stretched and contracted. As a result, the plurality of cover layers 319 may fix the circuit components 320. In addition, the plurality of cover layers 319 may prevent interference between the circuit components 320 and other elements during a process environment and/or a usage environment to protect the circuit components 320.

The plurality of cover layers 319 may include a bendable material or a stretchable material. For example, the plurality of cover layers 319 may include a silicone rubber such as polydimethylsiloxane (PDMS) or an elastomer such as polyurethane (PU). However, a material of the plurality of cover layers 319 is not limited thereto. The plurality of cover layers 319 may have an elasticity not to limit stretching of the base substrate 310. For example, the plurality of cover layers 319 may include the same material as the base substrate 310. The plurality of cover layers 319 may have substantially the same modulus as the base substrate 310. The plurality of cover layers 319 covering the circuit components 320 of the non-deformation region NTA may be selectively (locally) disposed in the non-deformation region NTA as shown in FIG. 9.

In the stretchable display device 1000 according to the sixth embodiment of the present disclosure, since the flexible PCB 300 has an elasticity, deformation such as stretching and contracting of the display panel is not excessively limited by the flexible PCB 300 and an excellent stretchable display device is provided. Further, the flexible PCB 300 has an elasticity and deterioration of the circuit components 320 due to an external force is prevented while the flexible PCB 300 is stretched and contracted.

Figure 11:
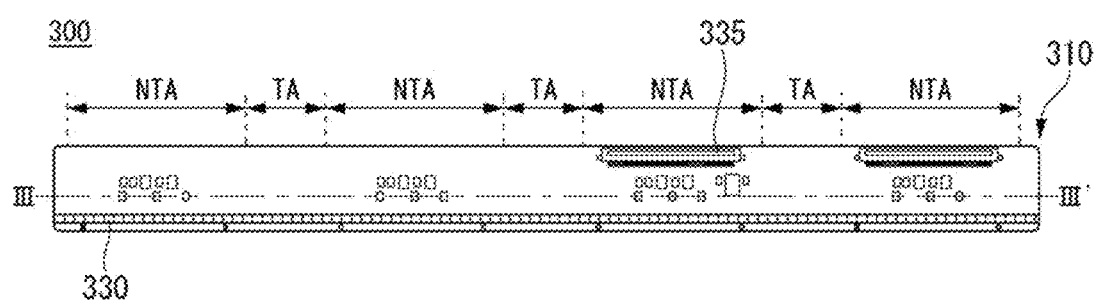
FIG. 11 is a plan view showing a flexible printed circuit board of a stretchable display device according to a seventh embodiment of the present disclosure.
Figure 12:
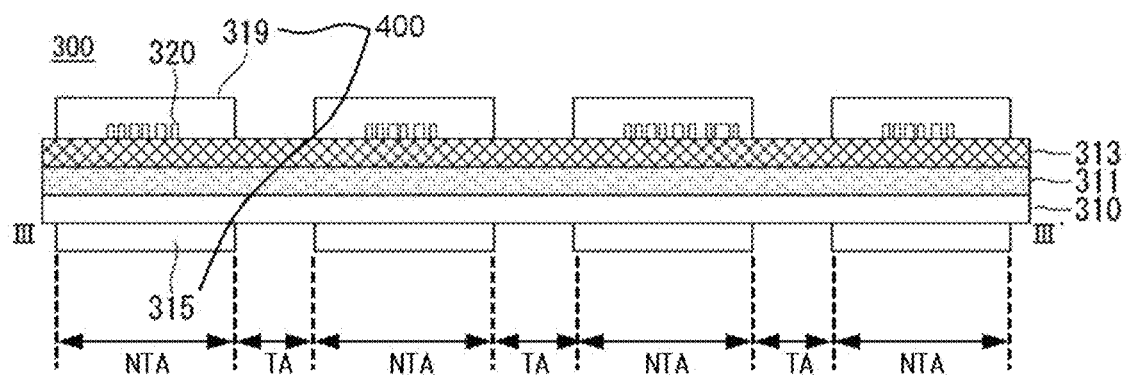
FIG. 12 is a cross-sectional view taken along a line III-III' of FIG. 11.

FIG. 11 is a plan view showing a flexible printed circuit board of a stretchable display device according to a seventh embodiment of the present disclosure, and FIG. 12 is a cross-sectional view taken along a line III-III' of FIG. 11. Illustration on parts of the seventh embodiment the same as those of the first and sixth embodiments will be omitted.

In FIGS. 11 and 12, the flexible printed circuit board (PCB) 300 includes a base substrate 310. A plurality of signal lines electrically connecting a plurality of circuit components 320 for generating and/or supplying a predetermined signal may be disposed on the base substrate 310. For example, the flexible PCB 300 may include a control unit and passive elements on the base substrate 310. The control unit may include a chip and a circuit for driving the circuit unit on the display panel 100 and the driving chip 220 on the connecting circuit 200. The passive elements may include a capacitor and a resistor.

The flexible PCB 300 may include a main pad 330 and a connector 335 on the base substrate 310. The main pad 330 may be electrically connected to the connecting circuit 200. The main pad 330 and the connecting circuit 200 may be attached to each other through a bonding process. The signal line may connect the main pad 330 and the control unit and/or the passive elements. The connector 335 may be electrically connected to an external system through a flexible cable. Although the flexible cable may be a flexible flat cable (FFC), the type of the flexible cable is not limited thereto.

The flexible PCB 300 may include a conductive pattern layer 311 and a protecting layer 313 disposed between the circuit components 320 and the base substrate 310. The conductive pattern layer 311 may include conductive patterns of a single layered structure or a multiple layered structure. The conductive patterns may be disposed in different layers with at least one insulating layer interposed therebetween. The conductive pattern layer 311 may be electrically connected to the circuit components 320 and/or the signal line through at least one via hole. A protecting layer 313 is disposed to cover and protect the conductive pattern layer 311.

The base substrate 310 supports and protects various elements of the flexible PCB 300. The base substrate 310 of a ductile substrate may include an insulating material capable of being bent or stretched. For example, the base substrate 310 may include a silicone rubber such as polydimethylsiloxane (PDMS) or an elastomer such as polyurethane (PU). However, a material for the base substrate 310 is not limited thereto. The base substrate 310 may have a modulus of about 1 MPa to about 999 MPa (several MPa to several hundred MPa). The base substrate 310 may have a stretching failure rate equal to or greater than about 100%. Since the flexible PCB 300 include a material having an elasticity, a stress of the flexible PCB 300 due to stretching of the stretchable display device 1000 may be reduced or minimized.

The flexible PCB 300 may include non-deformation region NTA and deformation region TA. The circuit components 320 may be disposed in the non-deformation region NTA on the base substrate 310. In the non-deformation region NTA, stretching and contracting of the base substrate 310 may be limited. The deformation region TA is disposed outside the non-deformation region NTA, and the circuit components 320 may not be disposed in the deformation region TA. In the deformation region TA, the base substrate 310 may be easily stretched and contracted. Although the non-deformation region NTA and the deformation region TA may be alternately and sequentially disposed along one direction, a disposition of the non-deformation region NTA and the deformation region TA is not limited thereto.

The flexible PCB 300 may further include a plurality of compensating layers 400. The plurality of compensating layers 400 may be selectively (locally) disposed in the non-deformation region NTA to prevent deterioration such as detachment or destruction of the circuit components 320 while the flexible PCB 300 is stretched and contracted.

Each of the plurality of compensating layers 400 may include a stiffener 315 and a cover layer 319. The stiffener 315 of each compensating layer 400 may be the same as the stiffener 315 of the first embodiment. The cover layer 319 of each compensating layer 400 may be the same as the cover layer 319 of the sixth embodiment.

In the stretchable display device 1000 according to the seventh embodiment of the present disclosure, since the flexible PCB 300 has an elasticity, deformation such as stretching and contracting of the display panel is not excessively limited by the flexible PCB 300 and an excellent stretchable display device is provided. Further, the flexible PCB 300 has an elasticity and deterioration of the circuit components 320 due to an external force is prevented while the flexible PCB 300 is stretched and contracted.

Figure 13:
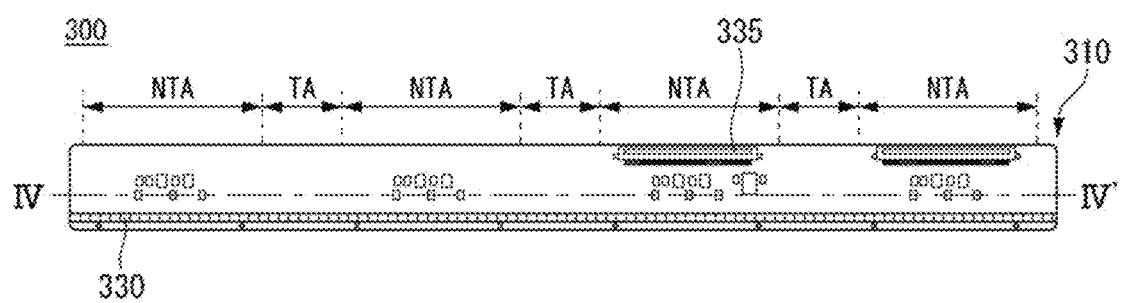
FIG. 13 is a plan view showing a flexible printed circuit board of a stretchable display device according to an eighth embodiment of the present disclosure.
Figure 14:
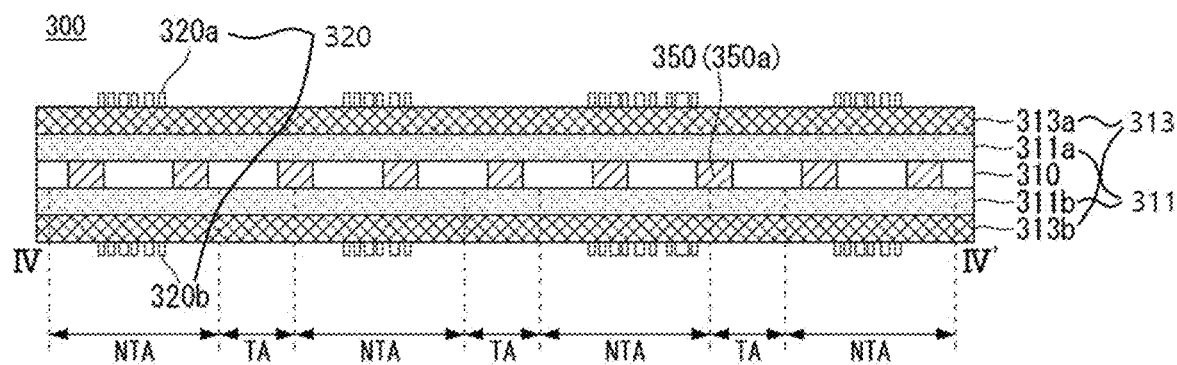
FIG. 14 is a cross-sectional view taken along a line IV-IV' of FIG. 13.
Figure 15A:
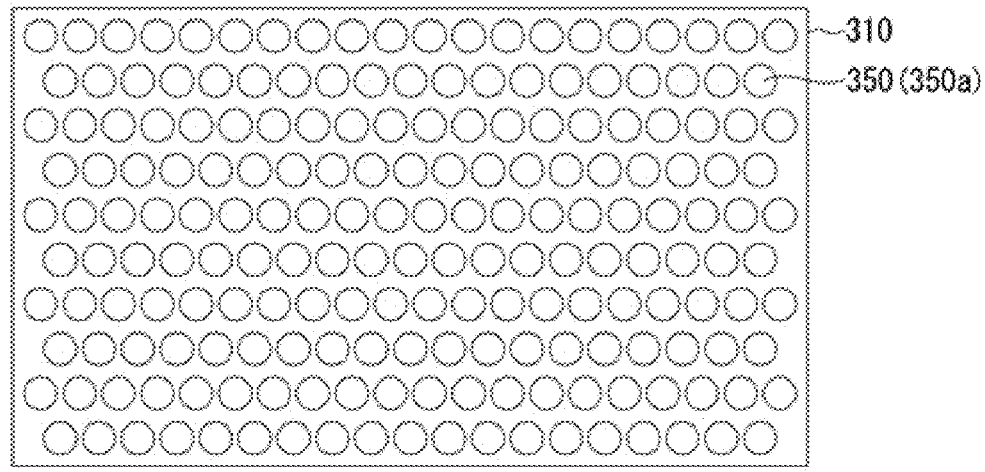
FIGS. 15A and 15B are a plan view and a perspective view, respectively, showing a base substrate of a stretchable display device according to an eighth embodiment of the present disclosure.
Figure 15B:
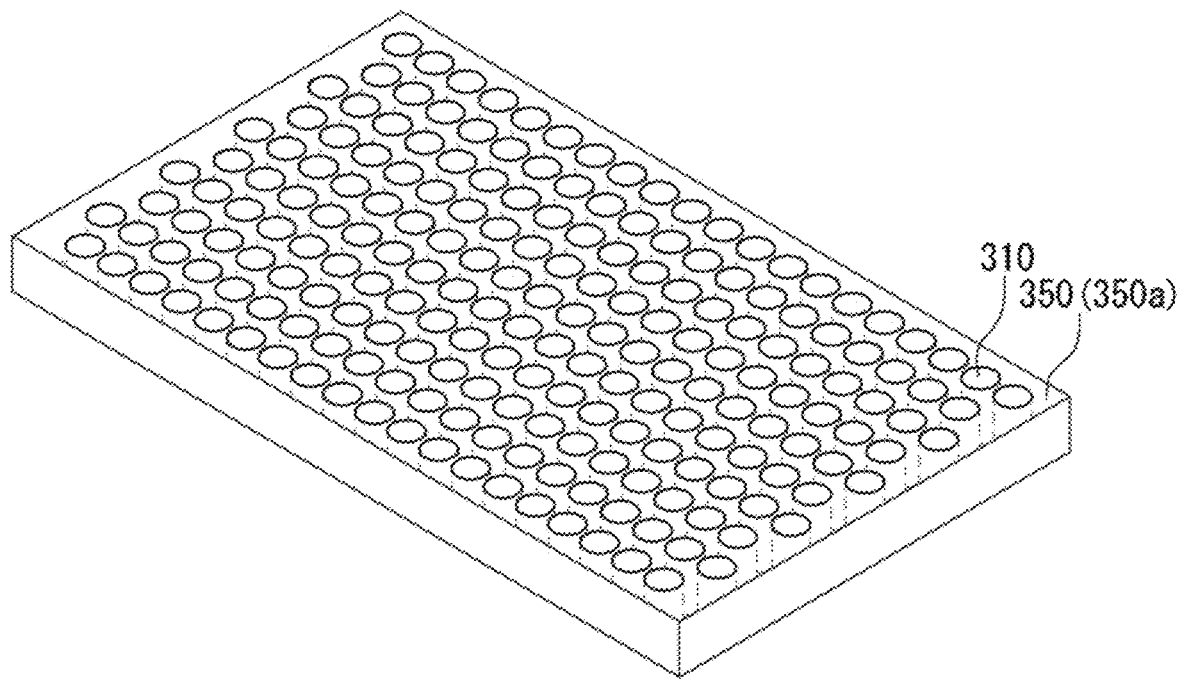
Figure 16:
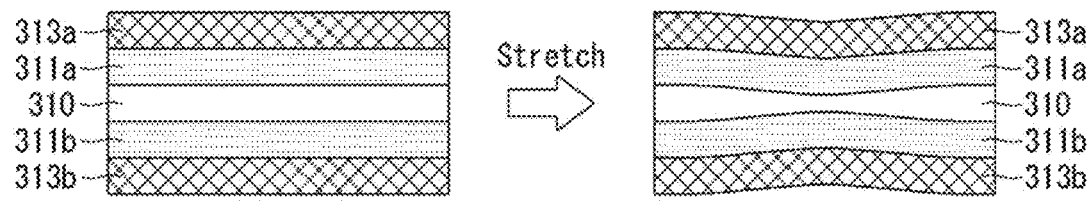
FIG. 16 is a cross-sectional view showing a base substrate without a through hole and a filling layer according to a comparison example before and after stretching.
Figure 17:
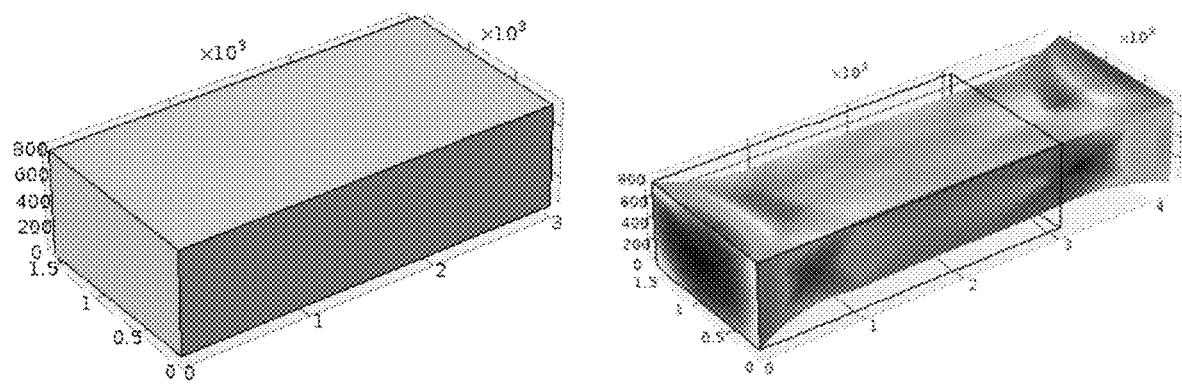
FIG. 17 is a simulation graph showing a base substrate without a through hole and a filling layer according to a comparison example before and after stretching.
Figure 18:
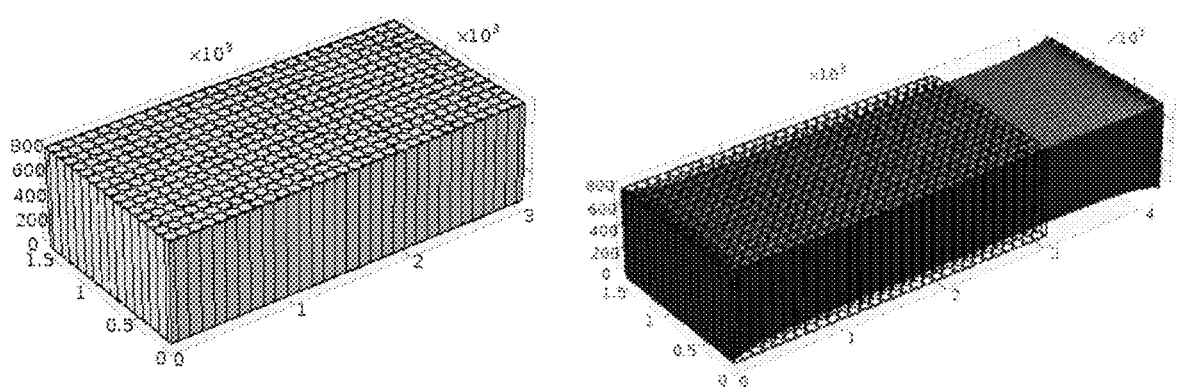
FIG. 18 is a simulation graph showing a base substrate of a stretchable display device according to an eighth embodiment of the present disclosure before and after stretching.

FIG. 13 is a plan view showing a flexible printed circuit board of a stretchable display device according to an eighth embodiment of the present disclosure, and FIG. 14 is a cross-sectional view taken along a line IV-IV' of FIG. 13. FIGS. 15A and 15B are a plan view and a perspective view, respectively, showing a base substrate of a stretchable display device according to an eighth embodiment of the present disclosure. FIGS. 16 to 18 are views showing effects of a flexible printed circuit board of a stretchable display device according to an eighth embodiment of the present disclosure.

In FIGS. 13, 14, 15A and 15B, the flexible printed circuit board (PCB) 300 includes a base substrate 310. A plurality of signal lines electrically connecting a plurality of circuit components 320 for generating and/or supplying a predetermined signal may be disposed on the base substrate 310. For example, the flexible PCB 300 may include a control unit and passive elements on the base substrate 310. The control unit may include a chip and a circuit for driving the circuit unit on the display panel 100 and the driving chip 220 on the connecting circuit 200. The passive elements may include a capacitor and a resistor.

The flexible PCB 300 may include a main pad 330 and a connector 335 on the base substrate 310. The main pad 330 may be electrically connected to the connecting circuit 200. The main pad 330 and the connecting circuit 200 may be attached to each other through a bonding process. The signal line may connect the main pad 330 and the control unit and/or the passive elements. The connector 335 may be electrically connected to an external system through a flexible cable. Although the flexible cable may be a flexible flat cable (FFC), the type of the flexible cable is not limited thereto.

The base substrate 310 may include first and second surfaces opposite to each other. The circuit components 320 may include first circuit components 320a disposed over the first surface of the base substrate 310 and second circuit components 320b disposed over the second surface of the base substrate 310.

The flexible PCB 300 may include a conductive pattern layer 311 and a protecting layer 313 disposed between the circuit components 320 and the base substrate 310. The conductive pattern layer 311 may include conductive patterns of a single layered structure or a multiple layered structure. The conductive patterns may be disposed in different layers with at least one insulating layer interposed therebetween. The conductive pattern layer 311 may be electrically connected to the circuit components 320 and/or the signal line through at least one via hole. A protecting layer 313 is disposed to cover and protect the conductive pattern layer 311.

The conductive pattern layer 311 may include first and second conductive pattern layers 311a and 311b. The protecting layer 313 may include first and second protecting layers 313a and 313b. The first conductive pattern layer 311a and the first protecting layer 313a may be sequentially disposed between the first circuit components 320a and the first surface of the base substrate 310, and the second conductive pattern layer 311b and the second protecting layer 313b may be sequentially disposed between the second circuit components 320b and the second surface of the base substrate 310.

The base substrate 310 supports and protects various elements of the flexible PCB 300. The base substrate 310 of a ductile substrate may include an insulating material capable of being bent or stretched. For example, the base substrate 310 may include a silicone rubber such as polydimethylsiloxane (PDMS) or an elastomer such as polyurethane (PU). However, a material for the base substrate 310 is not limited thereto. The base substrate 310 may have a modulus of about 1 MPa to about 999 MPa (several MPa to several hundred MPa). The base substrate 310 may have a stretching failure rate equal to or greater than about 100%. Since the flexible PCB 300 include a material having an elasticity, a stress of the flexible PCB 300 due to stretching of the stretchable display device 1000 may be reduced or minimized.

The flexible PCB 300 may include non-deformation region NTA and deformation region TA. The circuit components 320 may be disposed in the non-deformation region NTA on the base substrate 310. In the non-deformation region NTA, stretching and contracting of the base substrate 310 may be limited. The deformation region TA is disposed outside the non-deformation region NTA, and the circuit components 320 may not be disposed in the deformation region TA. In the deformation region TA, the base substrate 310 may be easily stretched and contracted. Although the non-deformation region NTA and the deformation region TA may be alternately and sequentially disposed along one direction, a disposition of the non-deformation region NTA and the deformation region TA is not limited thereto.

The base substrate 310 may include a plurality of through holes 350. The plurality of through holes 350 may completely penetrate the base substrate 310. An extension direction (penetration direction) of the plurality of through holes 350 may cross a predetermined stretching and contracting direction of the flexible PCB 300. For example, an extension direction of the plurality of through holes 350 may be perpendicular to the stretching and contracting direction of the flexible PCB 300.

The plurality of through holes 350 may be dispersively disposed in the base substrate 310. For example, the plurality of through holes 350 may be dispersively disposed in the non-deformation region NTA and the deformation region TA of the base substrate 310. Although each of the plurality of through holes 350 may have a circular shape in a plan view in FIG. 15A, a shape of the plurality of through holes 350 is not limited thereto. Each of the plurality of through holes 350 may include one of a polygonal shape and an elliptical shape in a plan view. For example, each of the plurality of through holes 350 may include a hexagonal shape in a plan view such that a denser arrangement of the plurality of through holes 350 is obtained.

A filling layer 350a may be disposed in each of the plurality of through holes 350. The filling layer 350a may have a smaller elasticity and a higher rigidity as compared with the base substrate 310. A modulus of the filling layer 350a may be greater than a modulus of the base substrate 310. Although a modulus of the filling layer 350a may be greater than 1000 times of a modulus of the base substrate 310, a modulus of the filling layer 350a is not limited thereto. Although the filling layer 350a may include a polyimide (PI) resin or an epoxy resin, a material of the filling layer 350a is not limited thereto. For example, the filling layer 350a may include a frame retardant 4 (FR-4).

The filling layer 350a in each of the plurality of through holes 350 may reduce a deviation in thickness of the base substrate 310 according to a position while the flexible PCB 300 is stretched and contracted. Since the extension direction of each through hole 350 crosses the stretching and contracting direction of the flexible PCB 300, stretching and contracting of the flexible PCB 300 may not be excessively limited by the filling layer 350a in each through hole 350. A position and a density of the plurality of through holes 350 and the filling layer 350a may be adequately selected within a limit that the elasticity of the base substrate 310 is not greatly reduced.

FIG. 16 is a cross-sectional view showing a base substrate without a through hole and a filling layer according to a comparison example before and after stretching.

When the flexible PCB 300 is deformed, the base substrate 310 may have a different thickness according to a position. For example, when the flexible PCB 300 is stretched and contracted, the base substrate 310 does not have a uniform thickness. Instead, a thickness of a central portion of the base substrate 310 may be smaller than a thickness of the other portion of the base substrate 310.

When the base substrate 310 has a non-uniform thickness, an impedance may be changed and a signal transmission quality may be deteriorated. When a circuit of the flexible PCB 300 is designed, an impedance matching is considered based on a power loss and a signal transmission. When the base substrate 310 has a non-uniform thickness due to stretching and contracting of the flexible PCB 300, an impedance mismatching may occur due to a deviation of a resistance and a signal transmitted through the conductive pattern layer 311 may be distorted. Since the conductive pattern layer 311 is patterned, the conductive pattern layer 311 may have a uniform thickness even when the flexible PCB 300 is deformed. However, since the base substrate 310 is not patterned, a property of the base substrate 310 of a comparison example may be deteriorated while the flexible PCB 300 is stretched and contracted.

In the flexible PCB 300 according to the eighth embodiment of the present disclosure, since the base substrate 310 includes the plurality of through holes 350 and the filling layer 350a, the base substrate 310 may have a uniform thickness even when the flexible PCB 300 is deformed. As a result, the impedance variation may be reduced or minimized and the signal distortion due to deformation of the flexible PCB 300 may be remarkably reduced.

FIG. 17 is a simulation graph showing a base substrate without a through hole and a filling layer according to a comparison example before and after stretching, and FIG. 18 is a simulation graph showing a base substrate of a stretchable display device according to an eighth embodiment of the present disclosure before and after stretching.

In FIGS. 17 and 18, when the base substrate 310 includes the plurality of through holes 350 and the filling layer 350a, a deviation in thickness according to a position is reduced.

Although not shown, the flexible PCB 300 may further include a plurality of compensating layers. The plurality of compensating layers may be selectively (locally) disposed in the non-deformation region NTA to prevent deterioration such as detachment or destruction of the circuit components 320 while the flexible PCB 300 is stretched and contracted.

Each of the plurality of compensating layers may include at least one of a stiffener and a cover layer. The stiffener of each compensating layer may be the same as the stiffener 315 of the first embodiment. The cover layer of each compensating layer may be the same as the cover layer 319 of the sixth embodiment.

In the stretchable display device according to the present disclosure, since the flexible PCB has an elasticity, deformation such as stretching and contracting of the display panel is not excessively limited by the flexible PCB and an excellent stretchable display device is provided. Further, the flexible PCB has an elasticity and deterioration of the circuit components due to an external force is prevented while the flexible PCB is stretched and contracted.

It will be apparent to those skilled in the art that various modifications and variation can be made in the present disclosure without departing from the spirit or scope of the disclosure. Thus, it is intended that the present disclosure cover the modifications and variations of this disclosure that come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stretchable display device, comprising:
a stretchable display panel;
a flexible printed circuit board connected to the stretchable display panel, the flexible printed circuit board including a non-deformation region and a deformation region outside the non-deformation region; and
a connecting circuit electrically connecting the stretchable display panel and the flexible printed circuit board,
wherein the flexible printed circuit board includes:
a stretchable base substrate;
a circuit component on the stretchable base substrate, the circuit component disposed in the non-deformation region;
a compensating layer on the stretchable base substrate and disposed in the non-deformation region;
a stiffener in the compensating layer, wherein the stiffener has a modulus greater than a modulus of the stretchable base substrate; and
a conductive pattern layer disposed between the circuit component and the stretchable base substrate,
wherein the circuit component includes a first circuit component disposed on a first surface of the stretchable base substrate and a second circuit component disposed on a second surface of the stretchable base substrate opposite to the first surface,
wherein the circuit component includes:
a first conductive pattern layer disposed between the first circuit component and the first surface of the stretchable base substrate; and
a second conductive pattern layer disposed between the second circuit component and the second surface of the stretchable base substrate, and
wherein the stiffener is disposed in at least one of a gap between the first conductive pattern layer and the first surface of the stretchable base substrate and a gap between the second conductive pattern layer and the second surface of the stretchable base substrate.

2. The stretchable display device of claim 1, wherein the stiffener includes a plurality of sub-stiffeners spaced apart from each other.

3. The stretchable display device of claim 1, wherein the stiffener includes a plurality of openings each having one of a hole shape at least partially or completely penetrating the stiffener and a groove shape at a portion where the stiffener was removed.

4. The stretchable display device of claim 3, wherein an area of each of the plurality of openings gradually decreases as each of the plurality of openings is disposed farther from the deformation region.

5. The stretchable display device of claim 3, wherein a density of each of the plurality of openings gradually decreases as each of the plurality of openings is disposed farther from the deformation region.

6. The stretchable display device of claim 1, wherein the stretchable base substrate has a first surface where the circuit component is disposed and a second surface opposite to the first surface.

7. The stretchable display device of claim 1, further comprising a conductive pattern layer disposed between the circuit component and the stretchable base substrate, wherein the stiffener is disposed between the conductive pattern layer and the stretchable base substrate.

8. The stretchable display device of claim 7, further comprising a filling layer disposed between adjacent stiffeners, wherein the filling layer includes a same material as the stretchable base substrate.

9. The stretchable display device of claim 1, wherein the stretchable base substrate includes a first base substrate having first and second surfaces opposite to each other and a second base substrate having first and second surfaces opposite to each other, wherein the circuit component includes a first circuit component disposed on the first surface of the first base substrate and a second circuit component disposed on the first surface of the second base substrate, and the stiffener is disposed between the second surface of the first base substrate and the second surface of the second base substrate.

10. The stretchable display device of claim 1, wherein the compensating layer includes a cover layer disposed over the stretchable base substrate and covering the circuit component.

11. The stretchable display device of claim 10, wherein the cover layer includes a same material as the stretchable base substrate.

12. The stretchable display device of claim 10, wherein the cover layer has a same modulus or substantially the same modulus as the stretchable base substrate.

13. The stretchable display device of claim 1, wherein the flexible printed circuit board includes a main pad disposed over the stretchable base substrate and electrically connected to the connecting circuit, and wherein the main pad is disposed in the non-deformation region.

14. A stretchable display device, comprising:
a stretchable display panel;
a flexible printed circuit board connected to the stretchable display panel, the flexible printed circuit board including a non-deformation region and a deformation region adjacent to the non-deformation region; and
a connecting circuit connecting the stretchable display panel and the flexible printed circuit board,
wherein the flexible printed circuit board includes:
a stretchable base substrate;
a plurality of through holes dispersively disposed in the stretchable base substrate;
a filling layer in the plurality of through holes;
a circuit component over the stretchable base substrate and disposed in the non-deformation region;
a stiffener in the compensating layer, wherein the stiffener has a modulus greater than a modulus of the stretchable base substrate; and
a conductive pattern layer disposed between the circuit component and the stretchable base substrate,
wherein the circuit component includes a first circuit component disposed on a first surface of the stretchable base substrate and a second circuit component disposed on a second surface of the stretchable base substrate opposite to the first surface,
wherein the circuit component includes:
a first conductive pattern layer disposed between the first circuit component and the first surface of the stretchable base substrate; and
a second conductive pattern layer disposed between the second circuit component and the second surface of the stretchable base substrate, and
wherein the stiffener is disposed in at least one of a gap between the first conductive pattern layer and the first surface of the stretchable base substrate and a gap between the second conductive pattern layer and the second surface of the stretchable base substrate.

15. The stretchable display device of claim 14, wherein the filling layer has a modulus greater than a modulus of the stretchable base substrate.

16. The stretchable display device of claim 15, wherein a penetration direction of the plurality of through holes cross a stretching direction of the flexible printed circuit board.

17. The stretchable display device of claim 15, wherein a direction of the plurality of through holes is perpendicular to a direction in which the stretchable base substrate is stretched.

18. The stretchable display device of claim 15, wherein a length direction of the through holes is transverse to a stretched direction of the stretchable base substrate.

* * * * *